United States Patent
Sayed

(10) Patent No.: US 7,610,219 B2
(45) Date of Patent: Oct. 27, 2009

(54) SYSTEM AND METHODS FOR ASSEMBLY OF A WEB SITE FOR AN ONLINE STORE BY A SELLER

(76) Inventor: Omar Farooq Sayed, 4076 W. Dublin St., Chandler, AZ (US) 85226

( * ) Notice: Subject to any disclaimer, the term of this patent is extended or adjusted under 35 U.S.C. 154(b) by 303 days.

(21) Appl. No.: 11/059,082

(22) Filed: Feb. 16, 2005

(65) Prior Publication Data

US 2005/0246627 A1    Nov. 3, 2005

Related U.S. Application Data

(60) Provisional application No. 60/545,028, filed on Feb. 17, 2004.

(51) Int. Cl.
  *G06Q 30/00*  (2006.01)
  *G06F 17/30*  (2006.01)
(52) U.S. Cl. .......................... 705/26; 705/27
(58) Field of Classification Search ............ 715/234, 715/255; 705/26–27, 37
  See application file for complete search history.

(56) References Cited

U.S. PATENT DOCUMENTS

| | | | |
|---|---|---|---|
| 5,845,299 A | 12/1998 | Arora et al. | |
| 5,890,170 A | 3/1999 | Sidana | |
| 5,911,145 A | 6/1999 | Arora et al. | |
| 6,038,562 A | 3/2000 | Anjur et al. | |
| 6,141,653 A * | 10/2000 | Conklin et al. | 705/80 |
| 6,219,680 B1 | 4/2001 | Bernardo et al. | |
| 6,263,352 B1 * | 7/2001 | Cohen | 715/206 |
| 6,304,886 B1 | 10/2001 | Bernardo et al. | |
| 6,304,915 B1 | 10/2001 | Nguyen et al. | |
| 6,343,302 B1 | 1/2002 | Graham | |
| 6,484,150 B1 * | 11/2002 | Blinn et al. | 705/26 |
| 6,546,397 B1 | 4/2003 | Rempell | |

(Continued)

FOREIGN PATENT DOCUMENTS

WO    WO 01/24089 A1    4/2001

OTHER PUBLICATIONS

"CafePress.com(R) and Paramount Digital Entertainment Join Forces to Deliver Specialized STARTREK.COM Merchandise to Star Trek Fans Everywhere; Fans of All Generations Can Keep on Trekkin' in T-shirts, Sweatshirts and Trucker Hats". PR Newswire, p NA. Nov. 9, 2004. [recovered from Dialog on May 26, 2009].*

(Continued)

*Primary Examiner*—Jeffrey A. Smith
*Assistant Examiner*—William J. Allen
(74) *Attorney, Agent, or Firm*—Greenberg Traurig, LLP

(57) ABSTRACT

A system and method for a web-based services architecture providing integrated modular building blocks for creating and maintaining a web site and related transaction processing to support electronic commerce and the sales of products and services using the web site. The transaction processing may include the handling of transactions and communications related to product and service sales and fulfillment involving customers, merchants and the web site owner. The services architecture may combine software front-end, back-end, and marketing tools to assist business owners to create or expand an Internet-based business. The services architecture also may provide a warehouse of predefined products that may be integrated into a merchant's existing online inventory.

14 Claims, 12 Drawing Sheets

U.S. PATENT DOCUMENTS

| | | |
|---|---|---|
| 6,581,061 B2 | 6/2003 | Graham |
| 6,697,825 B1* | 2/2004 | Underwood et al. ........ 715/207 |
| 7,080,070 B1* | 7/2006 | Gavarini ........................ 707/5 |
| 7,424,445 B1* | 9/2008 | Cue et al. ..................... 705/26 |
| 7,526,437 B1* | 4/2009 | Cue et al. ..................... 705/26 |
| 2001/0011265 A1 | 8/2001 | Cuan et al. |
| 2001/0034667 A1* | 10/2001 | Petersen ...................... 705/27 |
| 2001/0047289 A1 | 11/2001 | Mckee et al. |
| 2002/0032638 A1* | 3/2002 | Arora et al. ................... 705/37 |
| 2002/0095435 A1 | 7/2002 | Graham |
| 2002/0109713 A1 | 8/2002 | Carchidi et al. |
| 2003/0014442 A1 | 1/2003 | Shiigi et al. |
| 2003/0023514 A1* | 1/2003 | Adler et al. ................... 705/27 |
| 2003/0028685 A1 | 2/2003 | Smith et al. |
| 2003/0088617 A1* | 5/2003 | Clark et al. ................. 709/203 |
| 2003/0120659 A1 | 6/2003 | Sridhar |
| 2003/0121004 A1 | 6/2003 | Christensen et al. |
| 2003/0126033 A1* | 7/2003 | Evans et al. .................. 705/26 |
| 2003/0221162 A1 | 11/2003 | Sridhar |
| 2004/0098315 A1* | 5/2004 | Haynes et al. ................ 705/26 |
| 2004/0111286 A1* | 6/2004 | Koenig et al. .................. 705/1 |
| 2005/0065856 A1* | 3/2005 | Roberts et al. ............... 705/26 |
| 2006/0053079 A1* | 3/2006 | Edmonson et al. ........... 705/59 |
| 2006/0259418 A1* | 11/2006 | Feaver et al. ................. 705/37 |
| 2008/0167946 A1* | 7/2008 | Bezos et al. .................. 705/10 |

OTHER PUBLICATIONS www.citymax.com. Feb. 4, 2003 [recovered from www.archive.org on May 26, 2009].*

"Yahoo! Site Builder", webpage advertisement, http://webhosting.yahoo.com/ps/sb/, Feb. 1, 2004, 1 page.

"Yahoo! SiteBuilder 2.0 Manual", selected excerpts as downloaded on Feb. 4, 2004, 46 pages.

* cited by examiner

SYSTEM AND METHODS FOR ASSEMBLY OF A WEB SITE FOR AN ONLINE STORE BY A SELLER

RELATED APPLICATION

This application claims priority to Provisional Application No. 60/545,028, filed Feb. 17, 2004, the contents of which are incorporated herein in their entirety.

COPYRIGHT PROTECTION

A portion of the disclosure of this patent document contains material which is subject to copyright protection. The copyright owner has no objection to the facsimile reproduction by anyone of the patent document or the patent disclosure, in its entirety and in the form as it appears in documents published or released by the U.S. Patent and Trademark Office from its patent file or records, but otherwise reserves all copyright rights whatsoever.

BACKGROUND OF THE INVENTION

The present invention relates in general to systems and methods for creating and managing files associated with a computer network presence, and more specifically, for creating and maintaining a web site.

A business typically desires to create an online business presence or to expand its current business through the use of the Internet. Typically, these activities involve the creation of a web site and the use of other Internet-related support tools that are used to build traffic to the web site through marketing and other activities. Managing online commerce activities such as partnering arrangements, the tracking and fulfillment of product and service sales, and the sharing of affiliate commissions are also typically important to an online business presence.

Designing and building a web site for the online sales of products and services can be a complex activity even for an experienced web designer. It is desirable that the web site provide a wide range of products and services for sale to customers and include the ability to accept payment from such customers. Common approaches for building a web site now typically require that a designer create the web pages that will form the web site on a local computer and then upload the files using, for example, the ftp protocol to a server that will publish the web site. Expanding and/or maintaining an existing web site also involves editing and uploading new files to the server. Businesses and individuals without prior web design experience are not able to readily create and upload these files.

Thus, it would be desirable to have a system and method that reduces the time and effort required to create and maintain web sites useful for online commerce.

BRIEF DESCRIPTION OF THE DRAWINGS

The invention is pointed out with particularity in the appended claims. However, for a more complete understanding of the present invention, reference is now made to the following figures, wherein like reference numbers refer to similar items throughout the figures:

FIG. 14 illustrates an administration page presented to a user of the local computer of FIG. 1 for providing additional details regarding predefined products/services in a particular product/service category in accordance with an embodiment of the present invention.

Figure 1:
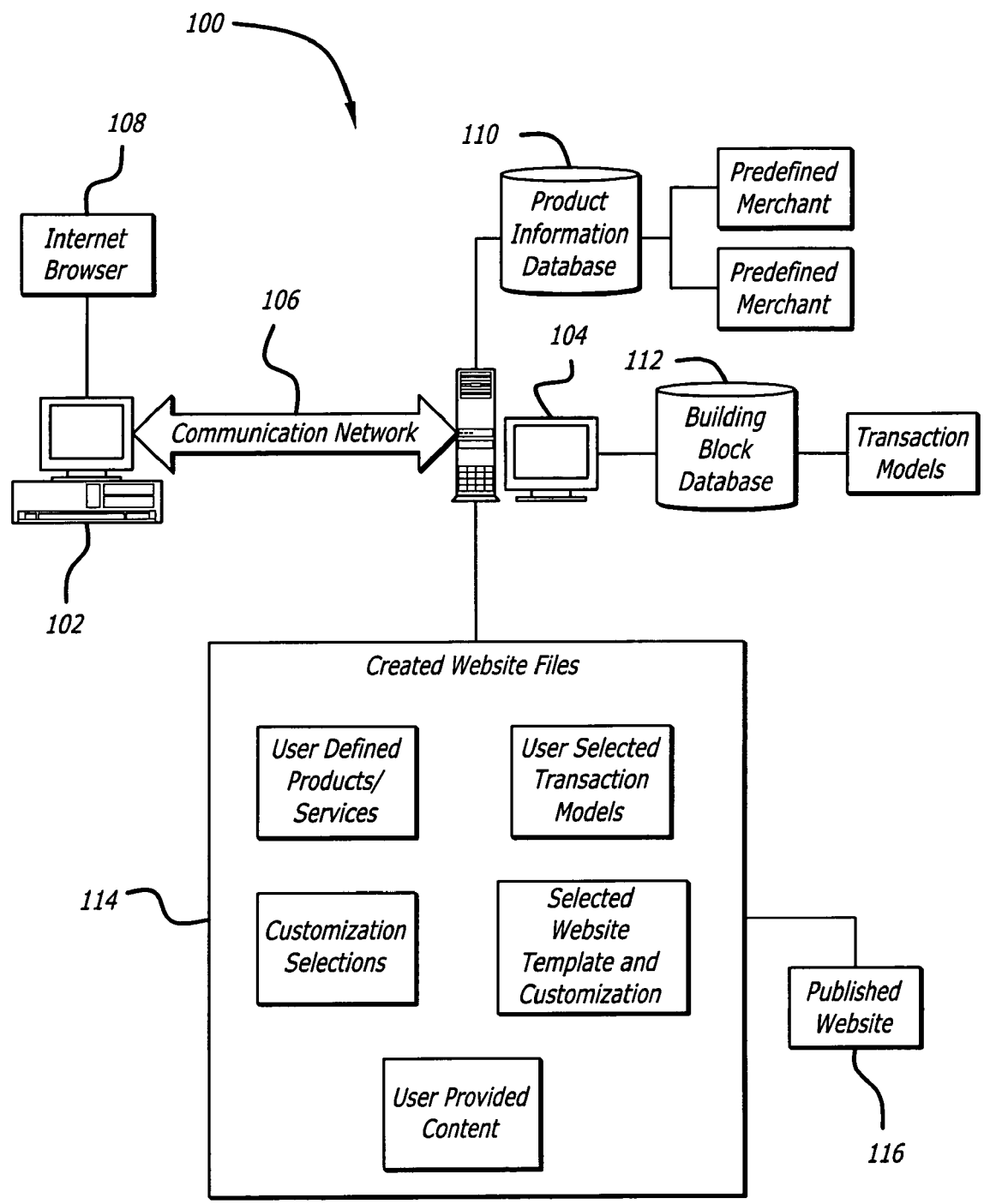
FIG. 1 illustrates a computer system including a local computer in communication with a server used to build a web site in accordance with an embodiment of the present invention.

The exemplification set out herein illustrates an embodiment of the invention in one form, and such exemplification is not intended to be construed as limiting in any manner.

DETAILED DESCRIPTION OF THE DRAWINGS

The following description and the drawings illustrate specific embodiments of the invention sufficiently to enable those skilled in the art to practice it. Other embodiments may incorporate structural, logical, process and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The elements that implement the various embodiments of the present invention are described below, in some cases at an architectural level. Many elements may be configured using well-known structures. The functionality and processes herein are described in such a manner to enable one of ordinary skill in the art to implement the functionality and processes within the architecture.

As used herein, the term "entity" refers to an individual, corporation, partnership, or other type of legal entity. As used herein, "affiliate" refers to an entity that promotes the products or services of a merchant in exchange for a commission or other payment or consideration for referrals made to the merchant. An online affiliate typically displays banners, advertisements, text links or products on a web site and is paid a commission by the merchant when a visitor the web site takes a specific action, such as filling out a form or making a purchase from the merchant. As used herein, "merchant" generally means a provider of goods and/or services. A merchant typically receives payment or other consideration for providing such goods and/or services. By way of example, a merchant may have advertisements and links to its products and services published on web sites of affiliates and pay those affiliates a commission for referrals that result from the affiliate's site.

The present invention provides a system and method for a web-based services architecture which may provide integrated modular building blocks for creating and maintaining a full and customized web presence such as, for example, a hosted and published Internet web site and related transaction processing to support electronic commerce and the sales of products and services using the web site. The transaction processing may include the handling of transactions and communications related to product and service sales and fulfillment involving customers, merchants and the web site owner. The services architecture may combine software front-end, back-end, and marketing tools to assist business owners to create or expand an electronic network-based business, for example on the Internet. The services architecture also may provide a virtual warehouse of drop-ship inventory that may be integrated into an entity's existing online inventory of products and/or services. The web site owner may create and manage the web site using an Internet browser in communication with a server or other computer providing the web services architecture.

The present invention generally relates to the creation and management of an Internet web site, which may include transaction processing capabilities. It is particularly suitable for small to medium-sized businesses looking to establish an online presence quickly with reduced risk and lower setup costs. More specifically, the services architecture may include a suite of tools to help new and experienced retailers or other merchants present, sell, process, and track their products on the Internet, with minimal initial capital investment and less extensive and a reduced number of business partnering contracts.

One advantage may be that merchants can create a new online business or expand their current brick-and-mortar or catalog business to the Internet. The web services architecture according to the present invention may include a suite comprised of software modules that can be used separately or in various combinations to suit a business's particular needs. These software modules may include a site building module, a store building module, a traffic building module, and an affiliate building module, which are each described in more detail below. Further information regarding a specific embodiment of these software modules and the web-based architecture may be found at the following URL: www.ibuilder.com In general, the site building module may enable a merchant to readily create its own web site by selecting from, for example, hundreds of predefined or existing web site templates. The site building module may present, for example, an image gallery to the merchant including customizable images, which can be modified by the merchant to complement a business's desired design. Other tools and services may be provided by the site building module including an HTML editor, management tools such as web site traffic reporting and statistics utilities, and web hosting.

The store building module may provide the functionality for the web site to incorporate electronic commerce. The store building module may include a catalog manager, which is designed to assist a merchant in tracking and managing its inventory and sales information. Merchants may also be able to review or change product lists, or may add new items to the catalog by completing forms presented over an Internet browser and the merchant's uploading of product images and text.

A detailed inventory management tool may also provided by a sales manager utility in the store building module, which allows merchants to keep a running inventory of every product in a catalog, verify each order, and approve products for shipping. A variety of online payment methods may also be made available to customers, for example, by designing the web services architecture to be compatible with conventional payment gateways. Merchants may, for example, be able to accept credit card transactions (for example, after a merchant account has been set up), electronic check transactions, and payments using the PAYPAL-branded service.

The store building module may also include a tax tool to assist merchants in controlling the amount of sales tax to charge to customers based upon where business is generated. The appropriate tax amount may be applied using menus and tools presented to the merchant during creation and/or management of the web site. Merchants may have the ability to offer marketing incentives to their current and potential customers, as the store building module may include functionality to enable the web site owner to create electronic coupons. The amount of the discount offered, its expiration date and limits on usage of a coupon may be selected and coupons sent to desired recipients. Merchants may also track the number of times that each coupon has been used. The store building module may also offer software that integrates incoming orders with, for example, QUICKBOOKS PRO software made by Intuit. This software may act as a bridge connecting a merchant's online sales-related information with its offline, for example QUICKBOOKS, accounting data.

The traffic building module may provide a combination of tools and reports that helps merchants market their web site and track advertising campaigns and productivity. The traffic building module may also include submission tools, which permits a merchant to submit information about its online store to Internet search engines. An electronic mail ("e-mail") function may also be provided, which permits merchants to build a mailing list and run an e-mail marketing campaign. For example, merchants may send out e-mail newsletters that feature new products, distribute electronic coupons, and announce promotions. The information about prior e-mail campaigns may be stored, allowing merchants to measure the effectiveness of each campaign and to assist in running increasingly more-effective campaigns.

The affiliate building module may provide a merchant the ability to create and manage its own affiliate sales program, which may be used to attract new customers by online referrals from, for example, other web sites. The affiliate building module may provide a pre-built registration form with fields used to gather information on potential affiliates. Once an affiliate signs up, it may automatically receive login information to access a business's available banners and links, and in addition may access its commission reports page. The affiliate building module may also permit a merchant to manage its affiliate programs, which may include the ability to keep track of affiliates' contact information and the nature of and other information associated with an affiliate's web site.

FIG. 1 illustrates a computer system 100 including a local computer 102 in communication over a communication network 106 with a server 104 used to build a web site under direction of a user of local computer 102. Communication network 106 may be, for example, the Internet or a local or wide area network. A user program 108, for example an Internet browser or an application to provide a graphical user interface to a user, may run on local computer 108 and provide access by the user to web or network services provided by server 104. A user account on server 104 may be activated, for example, using an activation code provided by the user.

The web site created by server 104 may be built using predefined objects or building blocks selected from building block database 112 by the user of local computer 102. Server 104 may present options for selection to the user in a user interface (discussed below) of user program 108. Web site files 114 are files created by server 104 to use in publishing web site 116 on, for example, the Internet. Building block database 112 may be stored on server 104 and/or other computers.

During the creation or later editing of published web site 116, the user may select predefined products or services stored in a product information database 110 for incorporation into a catalog of products and/or services to be offered, for example by a merchant, using published web site 116. Product information database 110 may be stored on server 104 and/or other computers.

Product information database 110 may have predefined merchants associated with and designated to provide certain products and/or services to customers that will visit published web site 116 and enter into transactions to obtain these products and/or services. These merchants may be changed from time to time by the entity controlling server 104. The user of local computer 102 may make selections of products and services from database 110 for incorporation into the web site being created. The user may also provide information to server 104 regarding other products, which may be defined by the user in a manner that is similar to or even identical to the data structure used to define aspects of the predefined product/service objects in database 110. These other products may be, for example, existing products of the merchant. Such existing products and predefined products and/or services stored in product information database 110 may be combined for offering to customers on web site 116 and managed using a catalog manager, which is discussed in more detail below.

When building the new web site, the user may also select one or more transaction processing models that may be associated with individual products and services to be offered on the web site. These transaction models may be selected from existing models defined by the operator of server 104. Examples of these transaction models may include an auction model, a customer to merchant model with product delivery by a predefined merchant, a customer to predefined merchant model with product ordering placed through web site 116, and an affiliate model. The user of local computer 102 may later change these models for selected products or services.

Web site files 114 may also contain content, such as for example graphics or logos, provided by the user from local computer 102. The user may also select additional customization options for the new (or modified, as may be applicable) web site 116, which selections will be stored as part of web site files 114. Web site files 114 may be stored, for example, on server 104 or on another server or servers controlled by server 104. Also, published web site 116 may be hosted, for example, by server 104 or on another server resident elsewhere.

Figure 2:
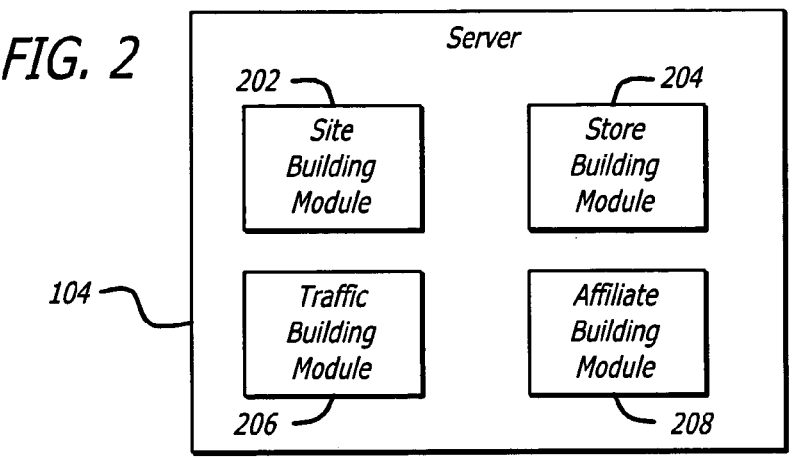
FIG. 2 illustrates software modules stored and executed by the server of FIG. 1 in accordance with an embodiment of the present invention.

FIG. 2 illustrates software modules stored and executed by server 104. These modules may include site building/management module 202, store building/management module 204, traffic building/management module 206, and affiliate building/management module 208 (each referred to herein simply as a "building module"). Site building module 202 is used to build web site 116 and may access building block database 112 and product information database 110. Site building module 202 generally enables the assembly of the basic components of a web site including design, navigation, and text. The user of local computer 102 may make selections and provide appropriate information for creating web site 116 using only user program 108. Building block database 112 may also provide an image gallery of graphic objects that may be selected by the user. These objects are designed for modular integration with the web site being constructed.

Site building module 202 may also include an editor, such as an HTML editor. This may permit the use of similar and familiar features used in other editors to insert tags, create links, organize code, and cut and paste content so that user convenience is increased. The editor may also include drag-and-drop and spell checking tools to create customized web pages for web site 116.

Site building module 202 also may permit the dynamic creation and maintenance of web site 116. Substantially any element of web site 116 from images to text to navigation may be updated almost instantaneously. This is typically done without contacting and paying an outside service to make such real-time changes. The editor may provide a "What You See Is What You Get" (WYSIWYG) mode of operation such that, for example, the text on web site 116 will appear in substantially the same fashion as typed in the editor: the same font style, size, and paragraph structure. Site building module 202 may permit previewing the text and other images and content as it will appear on web site 116 before it is actually published, making content editing quicker and more convenient.

Files 114 for the new web site 116 may be managed by a file manager utility that may be part of site building module 202. The file manager provides the user a visual list and other information regarding content, images and graphics that form published web site 116. Site building module 202 may permit the user to create the catalog that will be used to present products and services to potential customers on web site 116. The user may choose from a variety of different layouts for each catalog component, for example for product listings and a shopping cart.

After building blocks and products/services have been selected, and user customization is completed, web site 116 may be published in the same user session by the user's selecting an option presented by site building module 202, for example by clicking a button, to publish web site 116.

Figure 11:
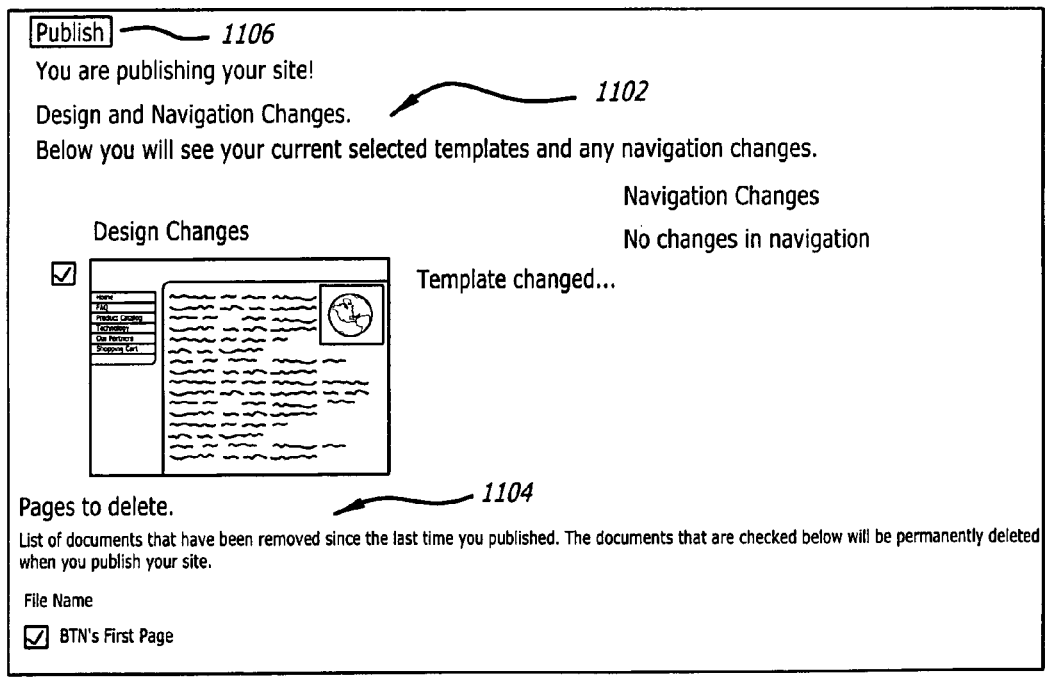
FIG. 11 illustrates a screen shot of an administration page presented to a user of the local computer of FIG. 1 for publishing a newly-created or modified web site in accordance with an embodiment of the present invention.

FIG. 11 illustrates a screen shot of administration page 1100 presented to the user of local computer 102 for publishing newly-created or modified web site 116 as mentioned above. Page 1100 may present a history 1102 of selected design changes made by the user, for example, since the last publication. These changes may include design and navigation changes. Page 1100 may also provide a list 1104 of documents that have been removed from web site files 114. These removed documents will not appear when web site 116 is re-published. Icon 1106 may be clicked on by the user to initiate publication of the modified web site.

Store building module 204 may include a catalog manager that permits reviewing or changing product/service lists. New items may be added to a catalog of products and services (to be presented on web site 116) by, for example, completing forms provided by the catalog manager and uploading product images and text for each product/service such as, for example, existing products of a merchant.

Figure 12:
FIG. 12 illustrates a catalog manager administration page for managing products on the web site of FIG. 1 in accordance with an embodiment of the present invention.

FIG. 12 illustrates a catalog manager administration page 1200 for managing products and/or services on web site 116. The user of local computer 102 may use page 1200 to add and/or delete products and services. Items 1204 may be listed and grouped by categories 1202 (e.g., "automotive"). Each of items 1204 may have sales information associated with it such as, for example, selling price, unit cost, the number of units previously sold, and cumulative total sales. Individual items may be selected for editing of product descriptions and features. By clicking icon 1206, the user may limit the view to only predefined products and services from database 110.

The user may also make changes using page 1200 to the selling price at which a product/service will be offered. For example, the user may click on a specific item 1204 using a mouse to initiate an option to change the price. Once entered, the price changes may be made effective immediately for viewing by customers on the published web site 116 without further action being required by the user. Selected items 1204 may also be deleted using page 1200. However, if an item 1204 has been ordered by a customer and is still in the process of being fulfilled, it preferably is not permitted to be deleted by the user until the fulfillment process has been completed.

Store building module 204 may also include a predefined product/service manager that permits the selection from a predefined list or inventory of products and services (sometimes referred to herein as a "warehouse" of products and services) that are available to be incorporated into web site 116, but provided by one or more predefined merchants. This predefined product/service manager may access product information database 110. Merchants providing warehouse items may be changed from time to time by the operator of server 104. Inventory management and shipping tasks for warehouse items are typically handled by an entity other than the owner of published web site 116.

Figure 13:
FIG. 13 illustrates an administration page presented to a user of the local computer of FIG. 1 for selecting predefined products/services to offer on the web site of FIG. 1 in accordance with an embodiment of the present invention.

FIG. 13 illustrates administration page 1300 presented to the user of local computer 102 for selecting predefined products/services from product information database 110 to offer on web site 116. The predefined products/services may be presented in categories 1302 and subcategories 1304, and an indication of the number of products/services in each category and subcategory may be provided (e.g., in parentheses next to a category name). The user may add all of the products/services in one or more given categories and/or subcategories to the catalog of products/services offered on web site 116, for example, by selecting the categories and/or subcategories and clicking on icon 1306. The predefined products/services are then preferably automatically added to the catalog and displayed on catalog manager administration page 1200. Categories 1202 for the added predefined products/services are preferably the same as the corresponding categories 1302.

FIG. 14 illustrates an administration page 1400 presented to the user of local computer 102 for providing additional details regarding predefined products/services in a particular product/service category 1302 or subcategory 1304. The user may view and individually select each product/service item 1402 for inclusion in the catalog offered on web site 116 by, for example, clicking on icon 1404. The added items may be displayed on catalog manager administration page 1200 as just described above.

Both existing products/services and predefined products/services may be presented to customers on web site 116. The manner of presentation of both existing and predefined products/services may be substantially identical, and the distinction between existing and predefined products/services may be transparent to a visitor to web site 116.

Figure 8:
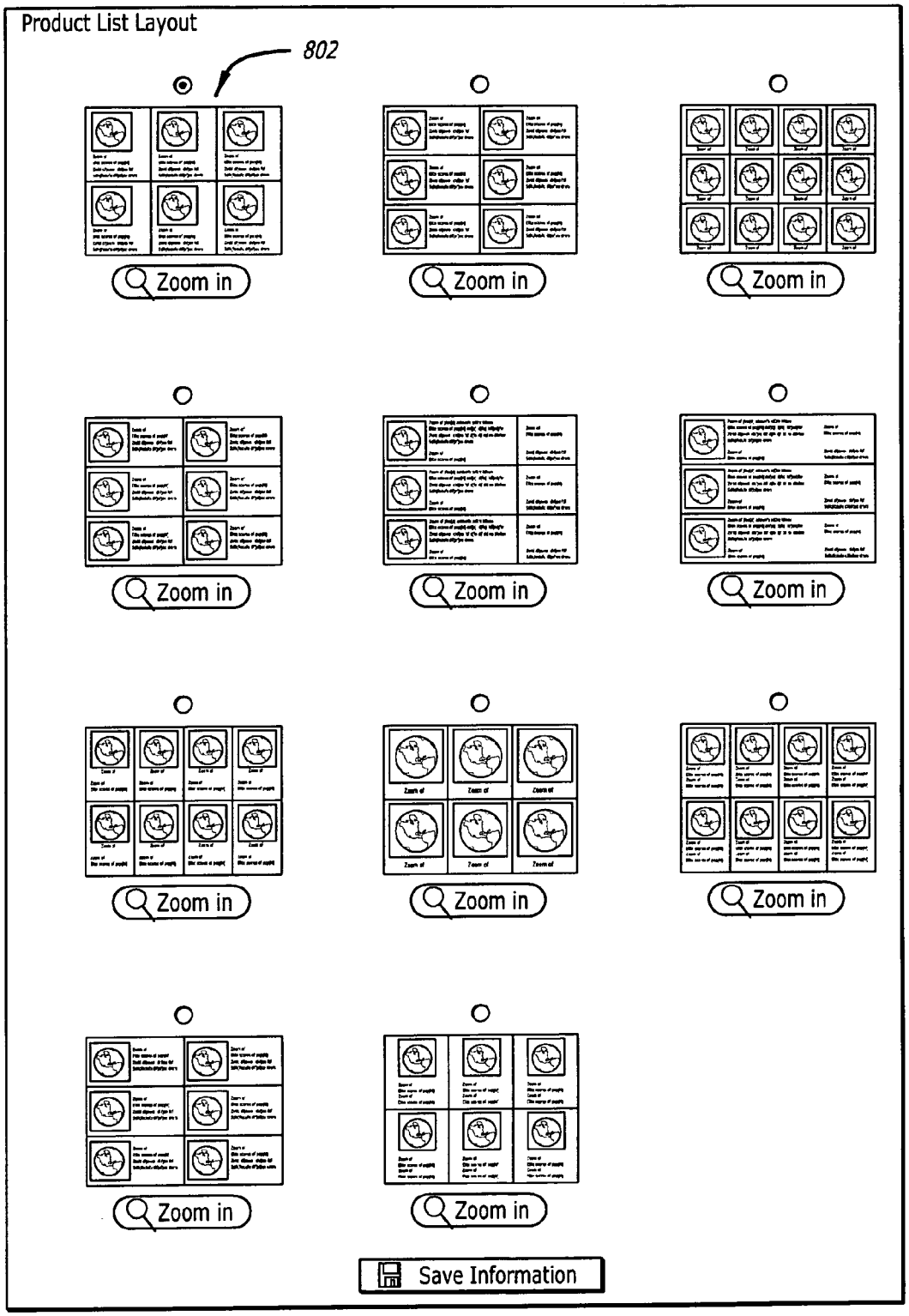
FIG. 8 illustrates a screen shot of product list layout templates presented to a user of the local computer of FIG. 1 when building a web site in accordance with an embodiment of the present invention.

FIG. 8 illustrates a screen shot of product list layout templates 800 presented to the user of local computer 102 when building web site 116. Templates 800 correspond to varying layout formats for presenting more than one product or service on a web page of web site 116 to customers. The user may, for example, select a particular template 802, which may be used to define the product/service layout for all products/services presented on web site 116.

Figure 9:
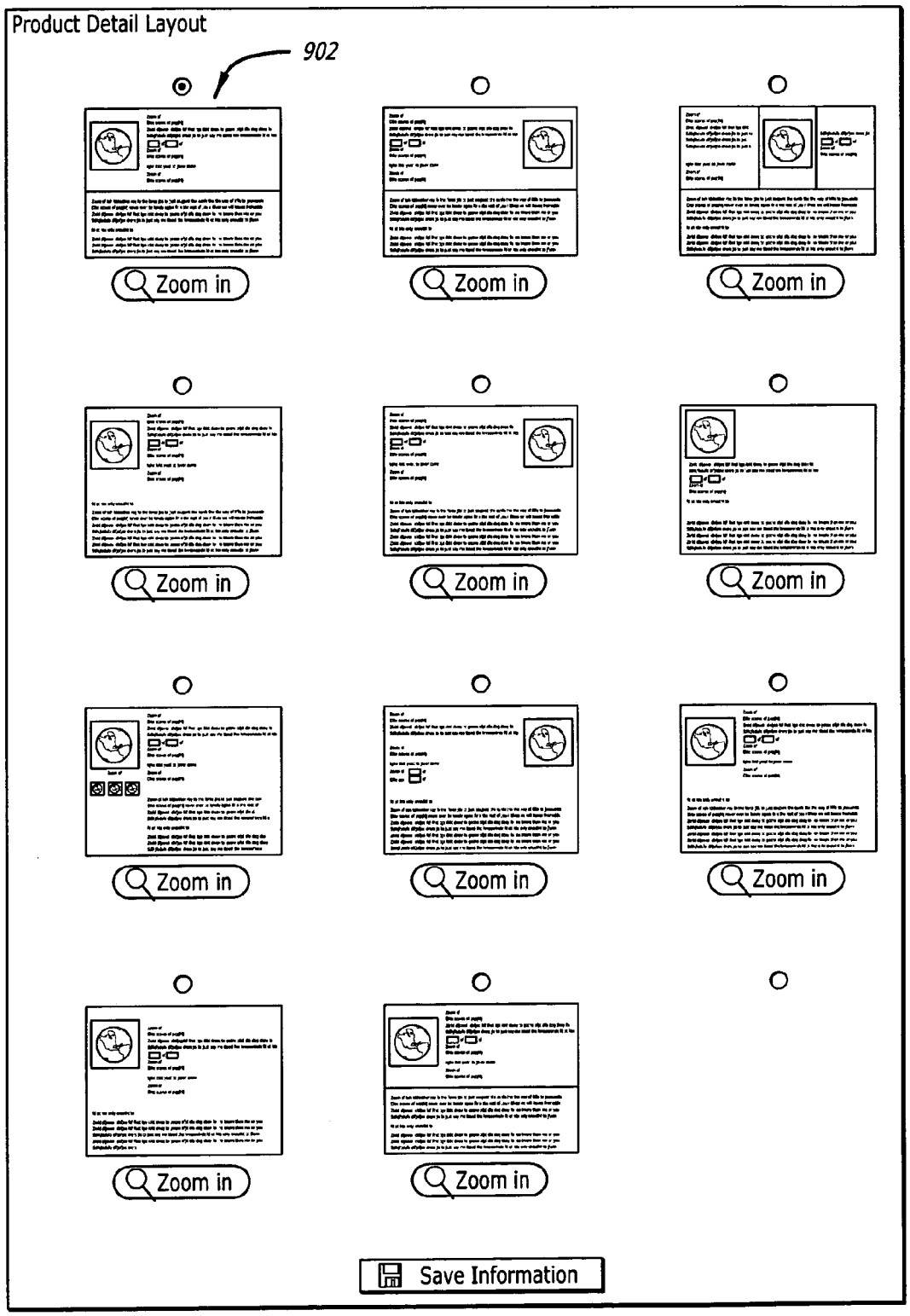
FIG. 9 illustrates a screen shot of product detail layout templates presented to a user of the local computer of FIG. 1 when building a web site in accordance with an embodiment of the present invention.

FIG. 9 illustrates a screen shot of product detail layout templates 900 presented to the user of local computer 102. Templates 900 correspond to varying layout formats for presenting details regarding a single product/service. A user may, for example, select a specific template 902, which may be used for displaying details for all products and services on web site 116.

Figure 10:
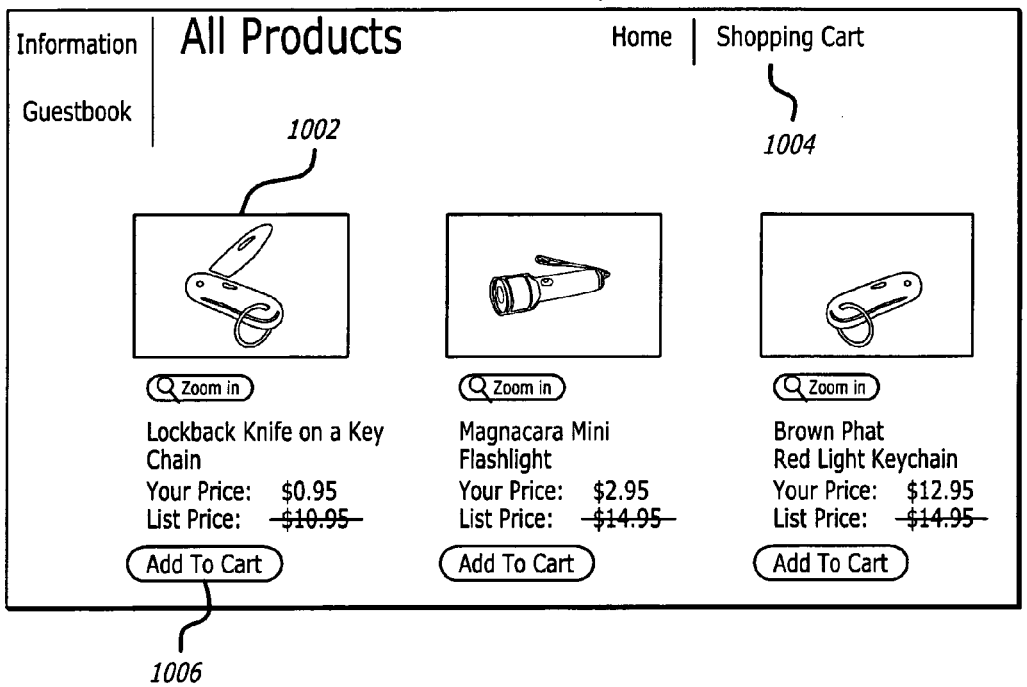
FIG. 10 illustrates a screen shot of a web site preview page presented to a user of the local computer of FIG. 1 when building a web site in accordance with an embodiment of the present invention.

FIG. 10 illustrates a screen shot of a web site preview page 1000 presented to the user of local computer 102. Preview page 1000 shows a web page of products substantially the same as or identical to the form page 1000 will have when published for customers. Each product/service 1002 may be purchased, for example, by clicking on icon 1006 to add the item to a shopping cart 1004.

Live and Design Views

In one embodiment of the invention, live and design views may be presented to a user by user program 108 to assist the user in initially developing or updating published web site 116. The phrase "live view" refers to an image of web site 116 that has been published for live viewing by visitors to web site 116. The phrase "design view" refers to an image of web site 116 prior to publishing, such as, for example, an image resulting from edits to the design of a previously-published web site 116. Software may be executed by server 104, for example, as part of site building module 202 to permit the user to view both a design and live view of one or more pages of the web site, for example, side-by-side on the same user interface screen. Alternatively, the user may be presented with live and design views on, for example, separate windows in the same user session.

Figure 15:
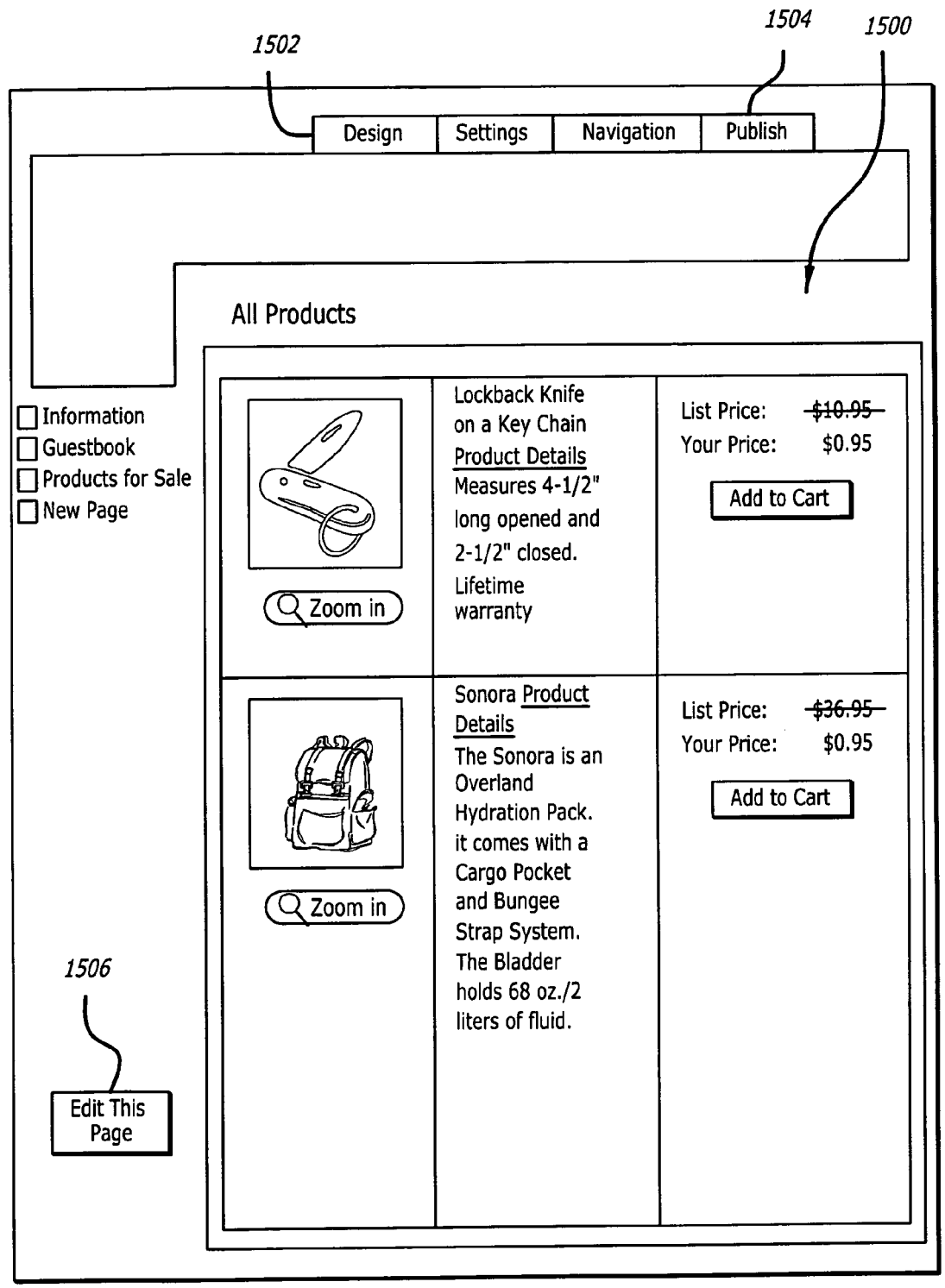
FIG. 15 illustrates a design view of a web page being developed in accordance with an embodiment of the present invention using the system of FIG. 1.

FIG. 15 illustrates a design view of a web page 1500 prepared using system 100 of FIG. 1. Certain information associated with page 1500 may be changed, for example, by the user's clicking on a tab 1502 and then entering updated information into, for example, another window (not shown) that provides new template selections or background images that may be applied to or included in the design view of the web page (and ultimately the live view once the design view is published as described herein). Additional changes may be made to page 1500 by, for example, clicking on tab 1506, which presents a new editor window (not shown) in which the user make edits of text and insert or delete images in a WYSIWYG environment. Such additional changes may be saved by clicking a button (not shown) on the editor window. Upon saving the additional changes, the design view of page 1500 may immediately incorporate these changes in the full web page image presented to the user.

After changes are made to the design view (as shown to the user on page 1500 incrementally as changes are made), the image of page 1500 may be published, for example, by selection of tab 1504 using a mouse. Selection of tab 1504 may lead the user to, for example, administration page 1100 described herein with respect to FIG. 11, which presents a summary of certain changes made to the web site prior to publishing.

Providing both live and design views to the user in the same session with two active windows or side-by-side views or otherwise in the same user session and accessible by clicking one or a few buttons (e.g., less than two or three buttons) to access newly-displayed windows within the same session is sometimes referred to herein as presenting views concurrently. A design view is sometimes referred to as a staging environment, and a live view is sometimes referred to as a production environment. The software running on server 104 accommodates the iterative nature of developing and launching a web site in its use of these live and design views. The user is able to switch between live and design views of published web site 116 in the same user session. Also, as described below, the present invention permits selective publishing as changes are made to the design view.

Although both live and design views are viewable concurrently by the user, the design view is preferably only alterable after the user has successfully inputted a password as part of a login procedure. In contrast, typically there is no password protection on the live site as presented in the live view. All user input to the password-protected login is preferably subjected to a user and password verification. Upon positive verification, access is provided to the user to effect changes to the design view and a user session is created.

When previous sessions have not resulted in the publication of a live view (or in the absence of previous sessions where a web site has not been previously created), all data values stored by server 104 relating to the live view are preferably set to nil. When previous sessions have existed in which at least some portion of a web site has been created, the live view comprises the most recent published view that has been saved by the user.

Software executing on server 104 may store a fixed number of the most significant versions (currently-published and previously created) of the live view so that these may be recalled and edited in the design view by the user in a later session. This fixed number of versions may be, for example, between 3 to 8 versions. The significance of one of these live view versions may be measured by the commonalities of elements that have existed in successively iterative versions of the live view during the lifetime of the web site. The commonalities that have existed more recently preferably supersede those that existed earlier.

At the outset of each user session, the design and live views may share the same data structure. When a design view is made available to the user for editing, preferably no replica of the previously-saved live view version is created. Thus, preferably only one data structure exists instead of distinct data structures for each of a live and a design view.

Substantially all of the components that appear on a web site, including but not restricted to templates, element colors, page types (for example, an "About Us" page or a storefront page), text, text orientation, hyperlinks, borders, lines, images, and references are stored as elements in a database. Typically, such elements have values that are stored in a database as element properties. This database may be stored on server 104 or on another computer in communication with server 104 over, for example, an Internet or local or wide area network connection.

When the user is ready to publish a new live view of its web site, software executing on server 104 may enable the user to select only those elements in the design view that the user desires to publish. This selection may be specified by the user through a series of "point-and-click" actions. Such "point-and-click" actions, also referred to as "user-specified inclusions" or "user-specified elements," preferably amount to the identification by the user of all those elements that need to be included in the live view. Other means of selection may also be used.

The software may look up the element properties of each "user-specified element" in the relevant database. The software may then compare the "user-specified elements" to the elements that exist in the current live view. If elements exist in both the design and live views, and there is a difference in the properties of the elements as they exist in the two views, the "user-specified elements" representing these differences and their properties may be isolated in a list by the software. A rules-based system, which may be included as part of the software running on server 104, may then determine how the "user-specified inclusions" appearing on the list are to be presented in the live view.

If an element has been specified in the design view, but does not exist in the live view, then it shall be included in the live view. If an element has not been specified in the design view for inclusion by the user, but the element already exists in the live view, then the element will be included in the live view.

Simultaneously with the application of the rules just discussed above, the software may also check for the "implied inclusion" of elements. Implied inclusions may result from the existence of certain parent-child relationships. Certain elements may be part of a parent-child relationship wherein an element is dependent on the existence of another element. Parent-child relationships may involve the presumption of inheritance wherein properties belonging to the "parent element" can also be presumed to belong to the "child element." An inheritance flag may specify whether such a relationship exists; such a flag is typically manifested in the software code on server 104.

The software's inherent logic preferably does not presume that there is always an inheritance of the parent element's properties by the child element. Instead, the software may recognize that whether an inheritance flag exists or not may depend on the nature of the element (for example, page type, color, template choice, etc.).

For the sake of illustration only, an example of a parent-child example is here provided. For example, a web site may have three pages as follows: Pages A, B, and C. Page A links only to page B, and page B links only to page C. The nature of the content that appears on page C presumes the existence of page B; and page B similarly presumes the existence of page A. There is then a parent-child relationship which exists between A and B, and between B and C. Thus, the inheritance flag may govern the appearance of "implied inclusions" in the live view in situations in which a user has specified the inclusion of a child element, but not the parent element.

The software may prioritize the sequence in which all inclusions (both user-specified and implied inclusions) will be presented in the live view. This sequence may be a function of business rules and is preferably alterable at the software code level. A visitor to web site 116 preferably does not have access to such business rules. Once the foregoing rules have been applied to the list of user-specified and implied inclusions, the changes are presented in the live view. A user session may be terminated by the user's logout from the session.

Traffic and Affiliate Building Modules

Traffic building module 206 may include a portal to pay-per-click marketing services and may also include a tool for preparing descriptions of web site 116 and facilitating submission of these descriptions to search engines. Affiliate building module 208 may permit daily monitoring of affiliate programs that have been selected and incorporated into web site 116. This monitoring may include a listing of all affiliates, and a listing of all commissions owed as well as the corresponding revenue generated.

It is desirable for the merchant that controls published web site 116 to have traffic driven to his web site. It is therefore desirable for the merchant to register affiliates so that they may refer traffic to web site 116. It is also desirable to keep track of referrals made by an affiliate so that commission payments may be made to compensate affiliate web sites for referring visitors who subsequently make purchases on web site 116.

Affiliates may be registered in, for example, one of two ways. The affiliate may either submit a form on the merchant's web site 116 indicating such a desire or a merchant user may register a new affiliate in the affiliate builder section of web site 116 by submitting a form. Once an affiliate is registered, the affiliate tracking information is established and the database may be updated. The values held in the database may include which of a group of, for example, four tracking identification methods (referral URL, entry URL, affiliate code, or user name) shall serve as the primary way of identifying the affiliate. Affiliate codes may be automatically generated by software executing on server 104 and e-mailed to the affiliate for inclusion in the affiliate's web site. Note that the merchant that controls web site 116 does not have to take additional actions to generate or distribute such codes to implement an affiliate relationship.

An affiliate code, when this is used as the primary affiliate identification method, is usually attached to information associated with the visitor by the referring affiliate and is then captured or otherwise interpreted when the visitor does arrive at web site 116. One specific example of such an affiliate code is 97493180. In the absence of such a code, one of the three other identification methods may be used to establish the identity of the referring affiliate. A referring affiliate typically would have previously been registered by web site 116 as a known affiliate with whom a commercial relationship to pay out a commission has already been established.

Software executing on server 104 may automatically capture the affiliate identification information attached to a visitor and track the visitor's activity by establishing a session each time the visitor visits web site 116. Any of the visitor's purchases on the web site may then be communicated to affiliate building module 208, which may automatically calculate and update the commission payout to the referring affiliate.

Additional Description

Figure 3:
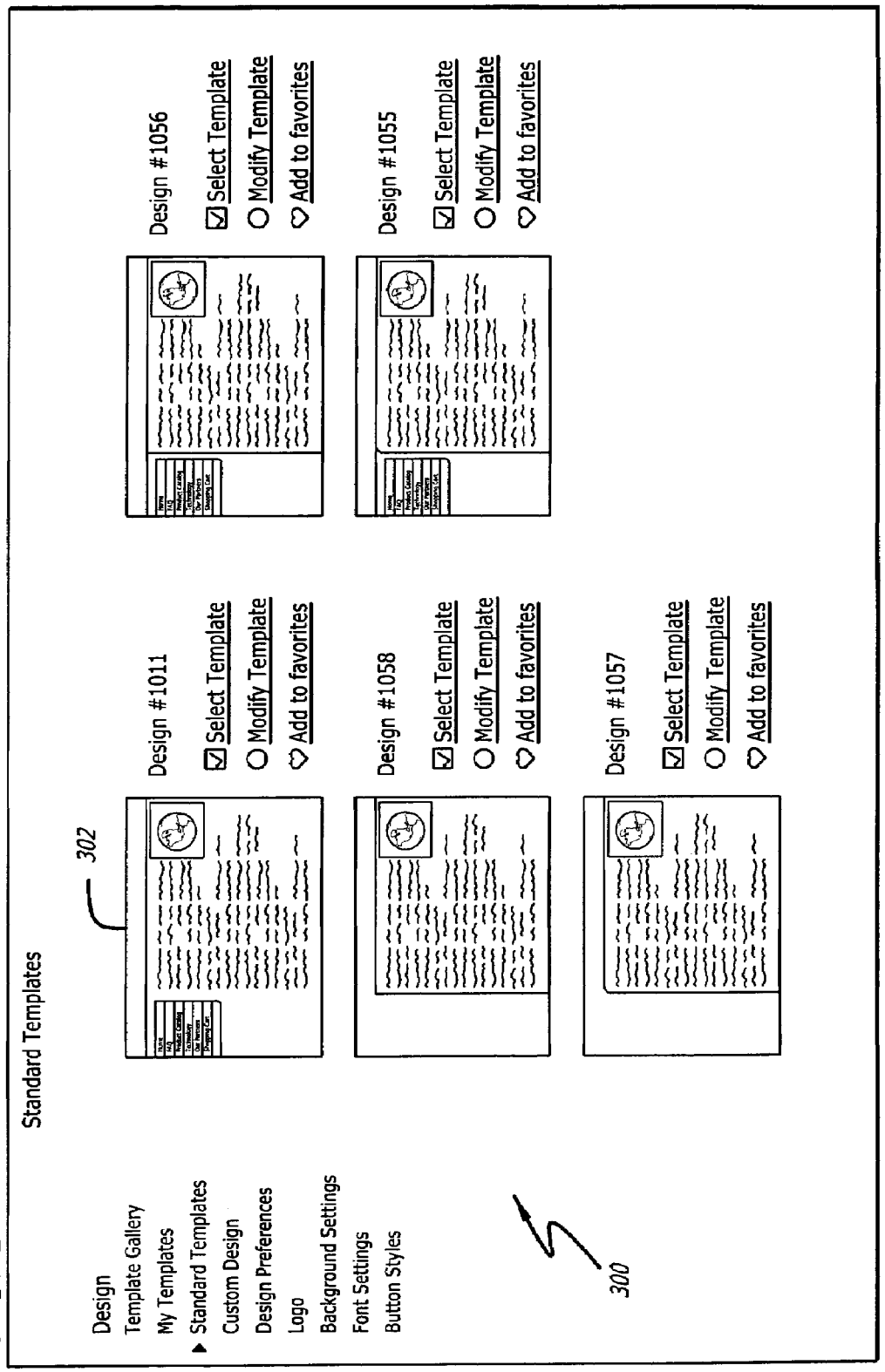
FIG. 3 illustrates a screen shot of predefined web site templates that may be selected by a user of the local computer of FIG. 1 in accordance with an embodiment of the present invention.

FIG. 3 illustrates a screen shot of predefined web site templates that may be selected by a user of local computer 102. Templates 300 may be presented to the user during operation of user program 108. The user may select a template such as selected template 302 by, for example, clicking on its image in the displayed screen using a mouse or other pointing device.

Figure 4:
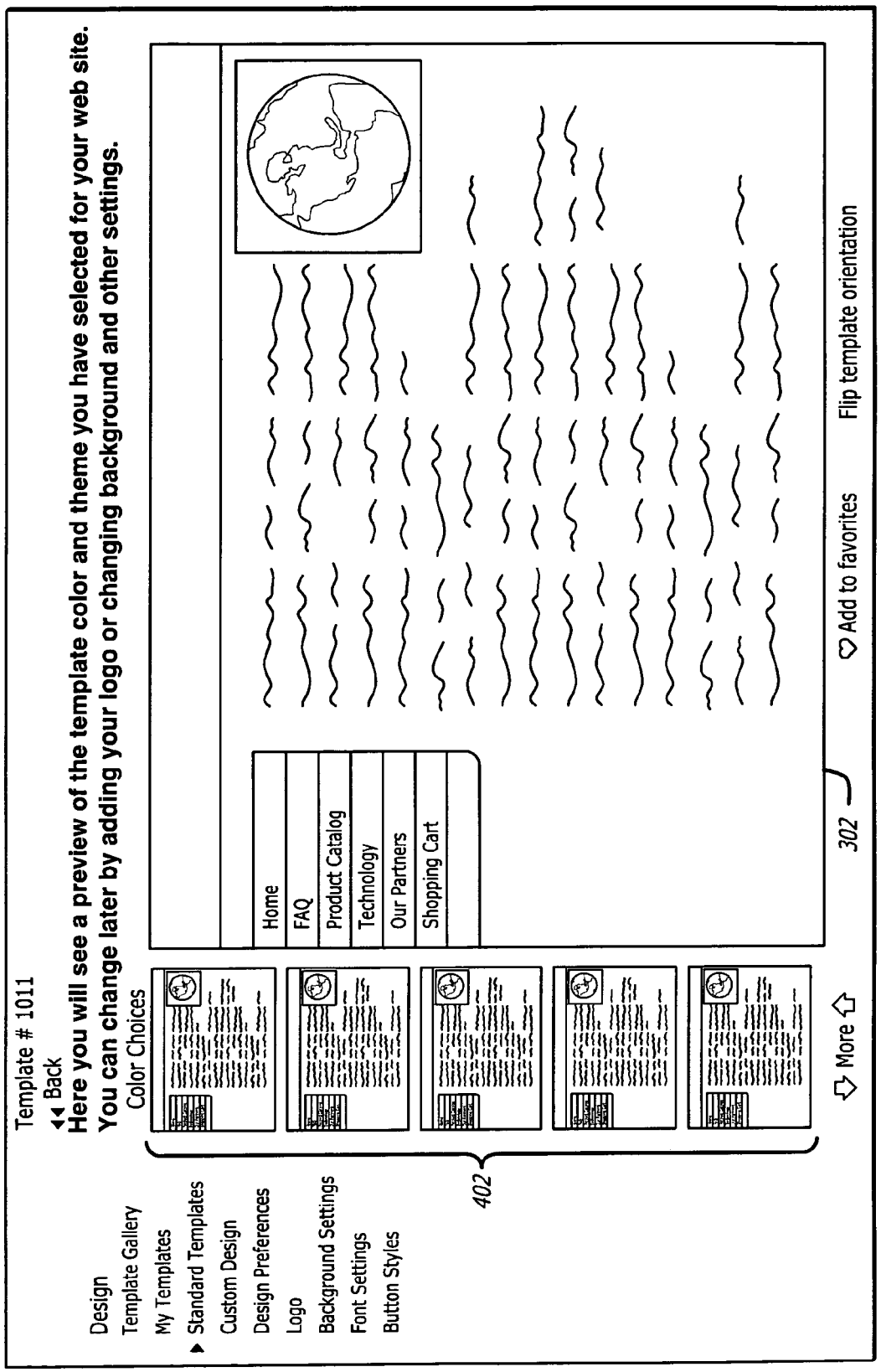
FIG. 4 illustrates a screen shot of customization options for a selected template from FIG. 3 in accordance with an embodiment of the present invention.

FIG. 4 illustrates a screen shot of customization options 402 for selected template 302. Options 402 are illustrated in FIG. 4 as, for example, color choices that provide varying color schemes for selected template 302. Other customization options 402 may be presented to the user such as, for example, choices of image theme, background, fonts, navigation, sound, orientation, or the use of certain predefined features like visitor counters and banners.

Figure 5:
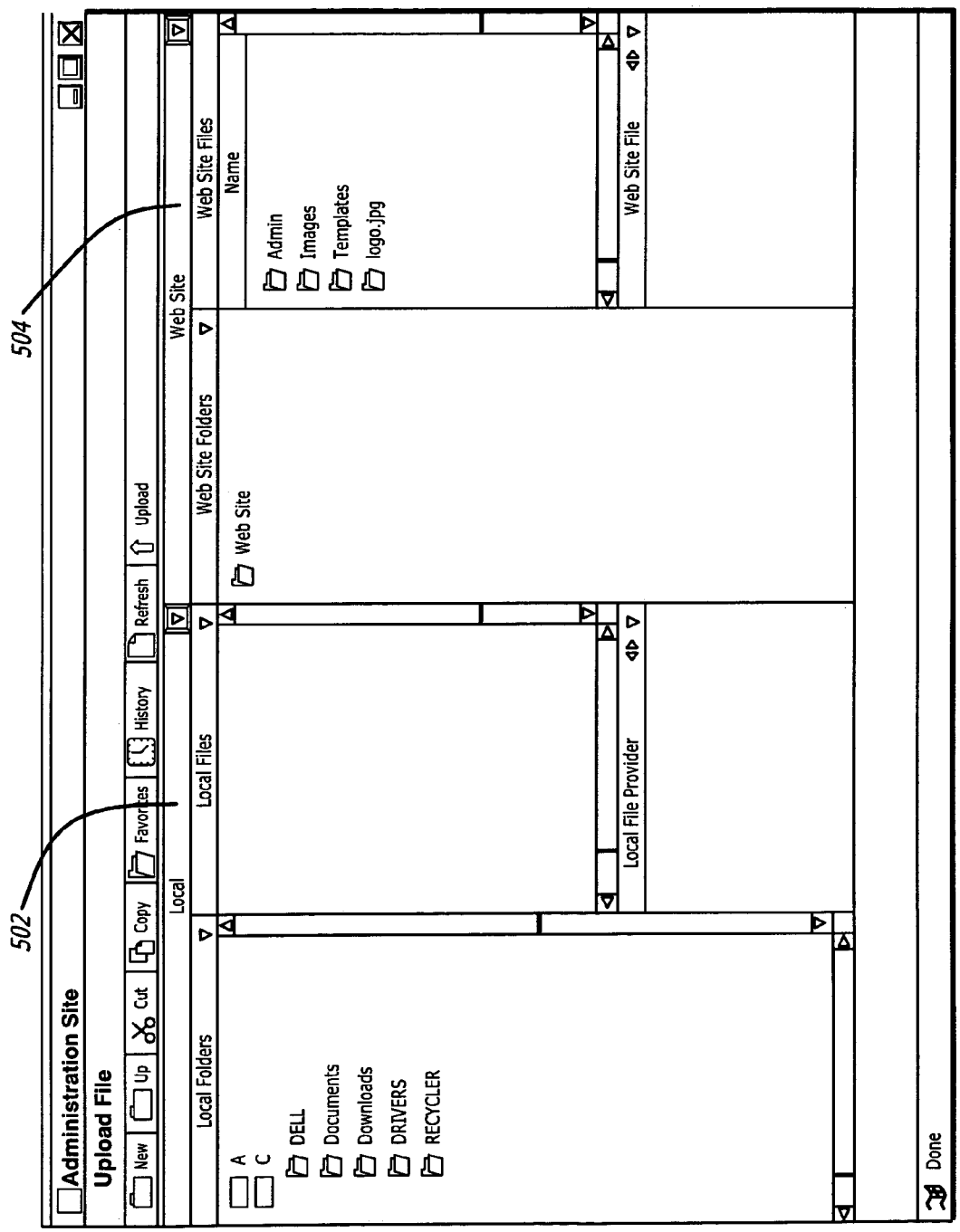
FIG. 5 illustrates a screen shot of a file manager for managing files associated with the web site created by the server of FIG. 1 in accordance with an embodiment of the present invention.

FIG. 5 illustrates a screen shot of the file manager of site building module 202 for managing files associated with web site 116. As part of the creation or updating of web site 116, content or other information stored as files on local computer 102 may be uploaded to server 104 for incorporation into web site files 114. These files may be transferred using the http protocol. This is in contrast to prior approaches that require use of the ftp protocol to make this transfer. The file manager provides a graphic representation of the file contents of web site files 114 in a region 504 and of the contents of files on local computer 102 in a region 502. Uploading of files may be initiated by the user's dragging and dropping of a file or folder icon from region 502 to region 504.

As web site 116 is built and managed, the file manager may assist in keeping all of the corresponding content, images and graphics organized and convenient to access. As information in the form of files that might be used to improve the quality of web site 116 is created or otherwise obtained, the file manager enables uploading of these files in an array of formats (for example, .gif, .htm, .doc, etc.). Site building module 202 may permit the incorporation of these files into web site files 114 and the publication of web site 116 with the new changes in the same user session.

Figure 6:
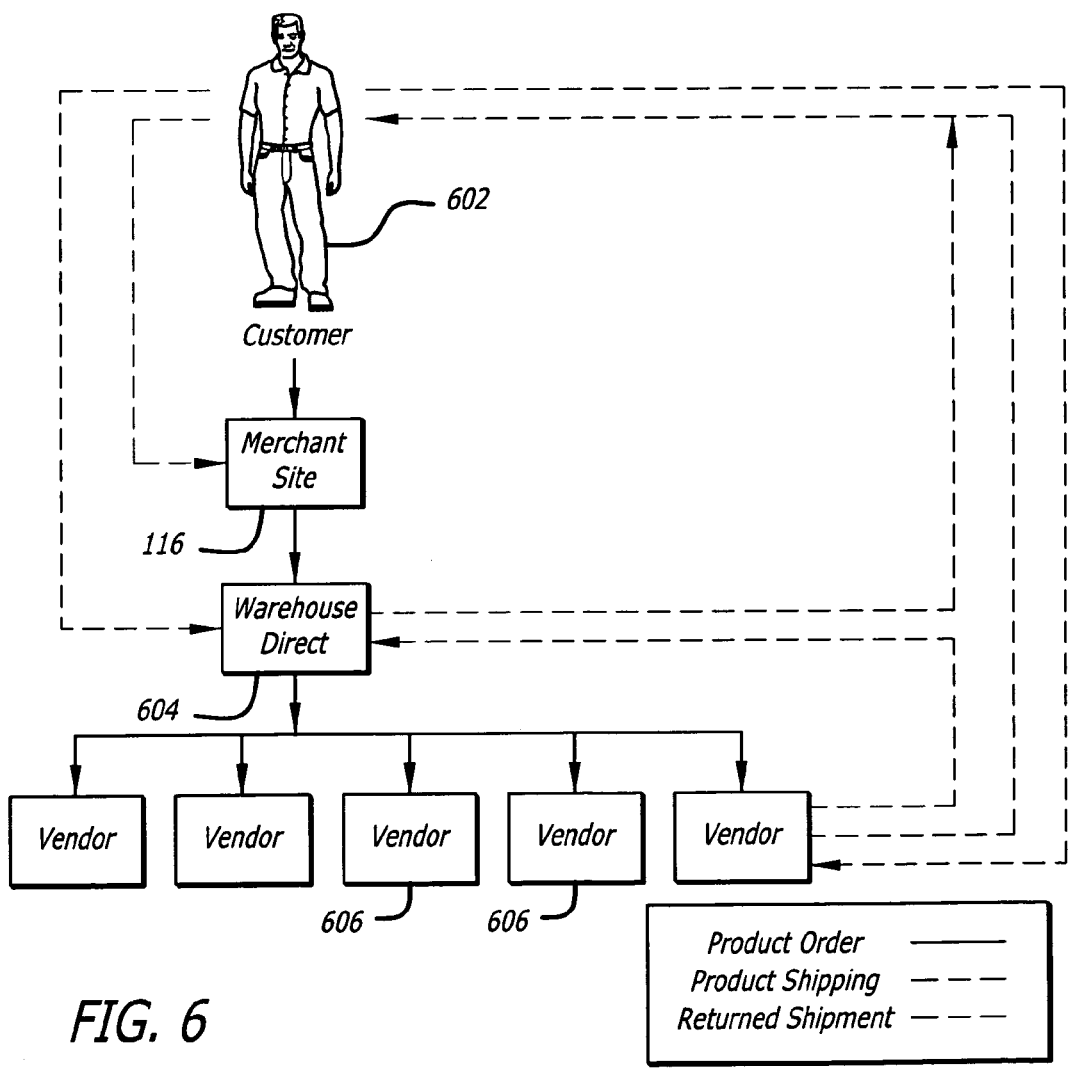
FIG. 6 illustrates a transaction model involving a warehousing entity for use in providing products and/or services to a customer using a web site in accordance with an embodiment of the present invention.

FIG. 6 illustrates a transaction model involving a warehousing entity 604 for use in providing products and/or services to a customer using web site 116. Customer 602 may access web site 116, which is controlled by a merchant, using, for example, the Internet and a web browser. Web site 116 may present numerous products and/or services to customer 602 as described elsewhere herein. Web site 116 may support numerous electronic commerce transaction models, and each one of the products and services available on web site 116 may be associated with one of these transaction models for use in receiving and fulfilling an order placed by customer 602.

The transaction models may include, for example, a customer-to-merchant model with product delivery by the merchant that controls web site 116, a customer-to-merchant model with product delivery by a predefined merchant other than the merchant that controls web site 116, a customer-to-predefined merchant model with product/service ordering placed through web site 116; an affiliate model wherein the affiliate refers a customer to a predefined merchant's web site for placing of a product/service order by customer 602 directly with the predefined merchant, and an auction model. Other transaction models may also be used. As will be discussed below in more detail, warehousing entity 604 is an entity that generally provides product/service fulfillment for certain products and/or services requested in orders received from customer 602 on web site 116. Warehousing entity 604 is generally a different entity than the merchant controlling web site 116.

Referring to FIG. 6, a customer-to-merchant model with product/service delivery by the merchant controlling web site 116 (referred to herein as the "controlling merchant") involves the placing of an order and completion of a transaction directly between the controlling merchant and customer 602. The fulfillment of product and/or service delivery is performed by or on behalf of the controlling merchant other than by use of warehousing entity 604.

A customer-to-merchant model with product delivery by a predefined merchant other than the controlling merchant involves the placing of an order and completion of a transaction directly between the controlling merchant and customer 602. The fulfillment of product and/or service delivery for certain products and/or services is performed by warehousing entity 604. Typically, the controlling merchant will have a contractual relationship with warehousing entity 604 regarding product/service fulfillment. Warehousing entity 604 may maintain some products in inventory, or itself have the capability to provide some services. Warehousing entity 604 may have relationships with various vendors 606 to obtain other products or services necessary to fulfill an order placed by customer 602.

Warehousing entity 604 may ship products in its inventory either to the controlling merchant or to customer 602. If warehousing entity 604 does not have a product in its inventory, one of vendors 606 may ship the product to warehousing entity 604 for subsequent shipment by warehousing entity 604. Also, a vendor 606 may ship the product on behalf of warehousing entity 604 directly to either the controlling merchant or customer 602. Product returns from customer 602 may be received, for example, by the controlling merchant, warehousing entity 604, or the vendor 606 that shipped the product to customer 602.

During the creation, and optionally during the subsequent updating, of published web site 116, web site files 114 may be formed to include records of the association between products and services to be offered on web site 116 and the transaction models that will be used (referred to herein as "transaction association records") in transactions with customers of or visitors to web site 116. More specifically, the transaction association records may specify one transaction model for each product and service. Further, the transaction model may be different for each product or service.

Store building module 204 may permit customization of the transaction association records including the changing or switching of the transaction model to be used with a particular product or service. This customization may be, for example, initiated by user program 108 or by the triggering of one or more rules in software executing on server 104, a server controlled or operated by warehousing entity 604, or another computer coupled to store building module 204. Optionally, a set of several predefined transaction models may be associated with a product or service, and the selection of the transaction model used for a particular order may be made conditional on another event such as, for example, the outcome of a rule executed in software on server 104 or by the warehousing software (defined below).

Store building module 204 may incorporate software logic to provide the various transaction models described herein. Store building module 204 may further communicate with software that is stored and executed on a server operated by warehousing entity 604 (referred to herein as the "warehousing software"). The warehousing software may be configured to receive information from store building module 204 regarding orders placed by customer 602. Specifically, the received information may include identification of the product and/or service ordered and an indication of the type of transaction model that the controlling merchant has associated with each product and service.

As mentioned previously, store building module 204 may provide a warehouse of products and services. Information defining this warehouse may be stored in product information database 110, which may be accessed by store building module 204. Warehousing entity 604 may also maintain access by the warehousing software to a database (not shown) that corresponds to product information database 110. The warehousing software may also have access to product information database 110, for example, over an Internet or other network connection.

During normal transactional operation of web site 116, store building module 204 and the warehousing software are preferably in regular communication, which may occur, for example, when new transactions are generated with customer 602. The entity controlling server 104 (referred to herein as the "server operator") may optionally provide the server hardware that hosts the activities of warehousing entity 604 described herein and on which the warehousing software is executed. However, another entity may provide this server hardware.

Store building module 204 and the warehousing software may each include optional functionality to account for a transaction processing fee, for example, for each transaction with customer 602. The transaction fee may be paid to the server operator as compensation for usage by the controlling merchant of store building module 204 and/or for usage by warehousing entity 604 of the warehousing software. Store building module 204 and the warehousing software may be in communication with accounting software (not shown) of the server operator so that transactional accounts resident within the accounting software format used may be updated.

Additionally, the warehousing software may communicate with each vendor 606 regarding purchases of products or services that warehousing entity 604 desires to make for fulfillment of an order by customer 602. To support this communication, each vendor 606 may execute management software (referred to herein as "vendor-level software"), for example, on a computer operated by or on behalf of vendor 606. This communication may provide the warehousing software with information regarding each vendor's inventory levels for each product and service capability. Rules for each vendor may be consolidated into the warehousing software. Purchase orders may be issued by the warehousing software to each vendor 606 to fill a customer order. The warehousing software may also consolidate purchase requirements for multiple transactions and/or customers into a consolidated purchase order sent to a vendor 606.

In one embodiment, warehousing entity 604 may host and operate the warehousing software using a server operated by the server operator, with access by warehousing entity 604 using, for example, an Internet browser. Also, the server operator may host and operate the vendor-level software, with access by the applicable vendor 606 using, for example, an Internet browser.

In addition to the above, store building module 204 may be configured to communicate with the vendor-level software. The system according to the present invention as described herein may provide a complete supply chain integration from the customer to the merchant to the warehouse to the vendor. The customer may place an order on the merchant's web site. The merchant may transact with warehousing entity 604 using the merchant's web site 116, and warehousing entity 604 may transact with vendor 606 using the warehousing software. The warehouse-to-vendor integration may be done in a few different ways since different vendors have different systems. The first such manner involves full integration. Fully-integrated vendors are those who manage their active database on system 100. The warehousing software can therefore directly interact with the vendor's database. The second such manner is remote integration wherein remotely-integrated vendors have managed databases housed outside of system 100; custom integration may then be set up with each vendor using available and commonly-employed or other known options, including but not limited to an XML interface, an ftp interface, an email interface or another custom communication system.

Once the communication system is established between the system and the vendor, the information that is being exchanged is essentially the same. The information being exchanged includes, for example, product information (including inventory availability, pricing and status) and order information (including shipping, payment, tax, shipment tracking and other specific order data).

The financial flows differ with each transaction type. In the financial accounting of a transaction in a customer-to-merchant model, funds are typically collected by the merchant. The merchant then has to separately purchase the products from the warehouse. Although these are separate financial transactions, both of these transactions may be managed within system 100 described herein.

In the financial accounting of the affiliate model, customer 602 is transacting with warehousing entity 604 through the merchant's web site 116. The merchant's web site 116 is preferably simply providing an entry and shopping experience for customer 602. The funds are collected by warehousing entity 604. The system 100 described herein may track a commission to be later paid to the merchant once the transaction has been shipped and closed. This financial accounting for the transaction between the customer 602 and warehousing entity 604, and the commissions paid to warehousing entity 604 may be managed in system 100.

As mentioned above, interactions by warehousing entity 604 with the appropriate vendors typically are done using various communication systems (not shown) depending on the options that are available. The financial transactions between warehousing entity 604 and vendors may differ depending on the type of relationship that is established. Some vendors allow, for example, 10, 15, 30, 60, or 90 days to pay for goods. Such payments are typically paid offline, and some vendors require an immediate credit card settlement. The financial transactions between warehousing entity 604 and the merchant are not typically managed through system 100.

For purposes of clarification, although system 100 may provide the technology for transactions to be processed, the actual funds typically do not "flow" through system 100. The actual funds usually flow through financial entities such as banks and financial networks such as, for example, VISA and MASTERCARD, and transactions are typically settled directly into a receiving party's bank. This movement of money is typically completely external to system 100.

Figure 7:
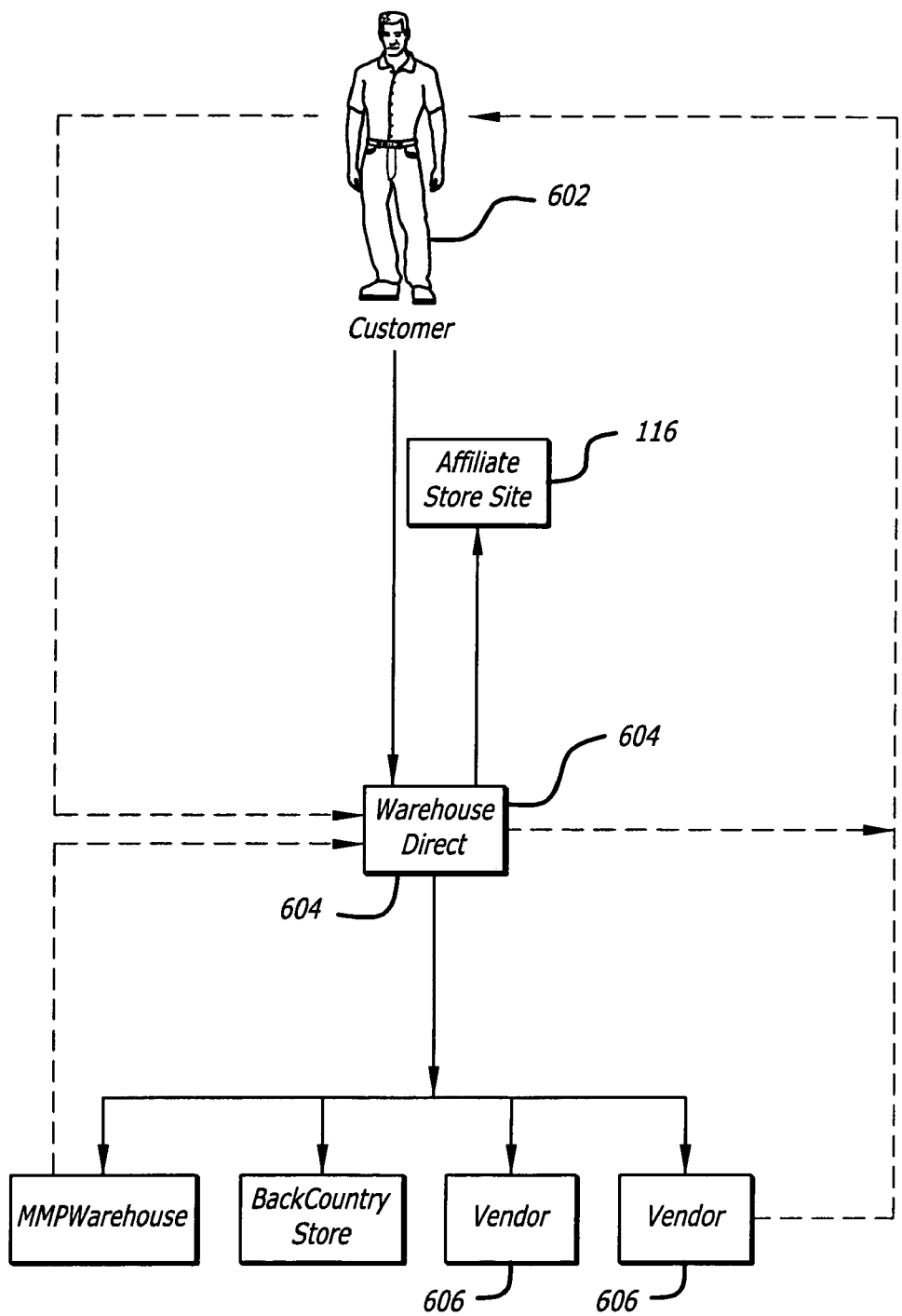
FIG. 7 illustrates a transaction model involving an affiliate for use in providing products and/or services to a customer using a web site in accordance with an embodiment of the present invention.

FIG. 7 illustrates a transaction model involving an affiliate for use in providing products and/or services to a customer using web site 116. The discussion provided above for FIG. 6 is generally applicable to FIG. 7 with a few exceptions discussed below. In FIG. 7, web site 116 acts as an affiliate store site in which customer 602 is referred to a predefined merchant's web site (for example, warehousing entity 604 as illustrated in and discussed below with respect to FIG. 7) for placing of a product/service order by customer 602. Although customer 602 typically first interacts with the affiliate store site, customer 602 enters a transaction directly with warehousing entity 604. The controlling merchant of web site 116 is typically paid a commission by warehousing entity 604 for each product and service purchased by referred customer 602.

Note that for the affiliate model of FIG. 7, product/service returns are typically made to warehousing entity 604, and are not generally made to the controlling merchant. Also, as described above for FIG. 6, note that vendors 606 may, for example, ship product to warehousing entity 604 or ship products on behalf of warehousing entity 604 to customer 602. Product is not generally shipped to the controlling merchant, which acts primarily as a referral source for the transaction.

Additional Transaction Model Information

Store building module 204 may be configured so that a user of user program 108 may apply one of a multitude of transaction models to its web site as discussed above. It is preferably not required that each such transaction model must be laboriously encoded each time such an implementation is desired. The user's choice of transaction model may be referred to as the "active transaction model," and the model is made by the user when it decides to subscribe to such a model through, for example, a point-and-click action in various parts of the design view of the web site being created or modified. If no choice is indicated by the user, a direct merchant-to-customer transaction model may be established as the default model.

A transaction model may take the form of merchant-to-customer in a storefront setting, merchant-to-customer in an auction setting, an affiliate model, or otherwise, as discussed above. The specificity of each transaction model may be stored as values in a database (accessible by software executing on server 104) representing the properties of each transaction model.

In general, all of the data used by server 104 (such as building block database 112 and other data described herein as interacting with server 104) may reside in a single location such as, for example, on a database on server 104 or on another computer. However, multiple databases and/or distributed databases and servers may also be used. Also, many different database structures may be suitable for use with the present invention. The foregoing databases may use supporting table structures, which may frequently change during operation of system 100. The tables that store the settings to enable the different transaction models may reside within a main merchant database (not shown) accessible by server 104. This may be the same database that is used for all other settings and information related to the operations of merchant's web site 116. The tables that store the transaction model settings may be used to direct the logic to call the appropriate functions for execution by software on server 104.

A transaction model may encapsulate most or all of the functions commonly found in a supply chain including order processing, fulfillment, order notification, payment processing, order tracking and returns management. Depending on which transaction model is selected, the responsibilities for each of these functions may all be assigned to a single entity or to various entities including, for example, the merchant, drop shippers, logistics managers, and others. Different values representing which type of entity the functions have been assigned may be stored as values in this database.

The active transaction model may govern the navigation path of a visitor (such as a customer) to the web site as and when a web site visitor indicates a desire to purchase or to find out more about a product or service. The visitor may indicate such a desire by way, for example, of using a mouse to select either a hyperlink or other button(s) on web site 116. The software logic of store building module 204 may then run processes and provide functions and methods that are related to the selected active transaction model. Certain functions of store building module 204 may not be called if they do not relate to the currently-active transaction model. For example, there may be no check-out function in the affiliate model and so this function is not called. A check-out function is similar to that function as found in a grocery store; a customer goes through the check-out process to pay for items in their shopping cart. Similarly, the check-out process in system 100 also may obtain all of the information that is needed from customer 602 so that payment may be collected and processed for items selected and placed in the shopping cart of customer 602.

Additional Integration Information

One advantage of the system and method described herein is the manner in which the software modules executing on server 104 may cooperate with one another and may share information to reduce the number of steps, and thus the time, required for the user of user program 108 to implement a breadth of functions throughout the lifecycle of web site 116 as would be required with prior tools. The automated flow of certain data among and across modules on server 104 according to the present invention may provide these benefits.

The life cycle of a web site for e-commerce typically begins with its design and layout and extends to among other things, the addition of a storefront, the populating of the storefront with products, the publication of a selected design view, the tracking of traffic activity on the web site, the promotion of the web site through affiliate programs or search engine submissions, and the calculating and paying out of commissions to affiliates.

The present invention may be used to provide an integrated data flow among software modules and software modules that are pre-built to exchange data with each other. This integration may reduce the extraction of data being collected by separate software tools as done in prior approaches and the need to then laboriously populate or input the relevant data to other software tools that might need them to perform other functions in the life cycle. The present invention may also permit the avoidance of prior approaches in which modules are encoded to call functions required or desired in the web site life cycle and then data must be manually integrated by building "data bridges" among the modules or functions. This can be a laborious process, especially if third party functions are being integrated with a merchant's proprietary code. An example of this integration of a third party function is the use of a web site building tool from a vendor A, followed by the purchase of a shopping cart module from a vendor B, followed by an attempt to integrate the two modules by implementing the software logic that enables numerous data exchanges similar to those described for the integrated system of the present invention.

Once web site 116 has been published and a live view exists, each of the software modules on server 104 may perform a function based on a certain visitor's action on web site 116. Based on this trigger (in other words, the performance of an action by the visitor), other of the modules may be provided data, to the extent that it is required, so that such module may perform another related or even un-related function. One such dataflow exchange may manifest itself in the self-management of traffic building module 206.

In a preferred embodiment, two of the modules may update traffic building module 206: store building module 202 and affiliate building module 208. Typical updates by store building module 204 and affiliate building module 208 are exemplified below. The entire check-out process managed by store building module 204 may elicit billing and shipping information, payment information and so on from a visitor following the visitor's decision to purchase a product displayed in the store front presented on web site 116. The relevant visitor information may be passed by store building module 204 to an e-mail marketing center database (not shown) housed in traffic building module 206 so that the name, interests, and e-mail information is added to an e-mail list maintained by the marketing center database for the purpose of sending out highly-targeted e-mail messages. The people whose names appear in the e-mail marketing center database may then be automatically added to the list of recipients of updates or e-mail information, whenever the next relevant e-mail campaign is launched by the merchant. Similarly, the addition of an affiliate to the list of registered affiliates stored in a database accessible by server 104 and preferably maintained in an automated fashion may also be automatically added to the list of people whose names appear in the e-mail marketing center. This may be similarly accomplished by the automated population of values in pre-existing fields in the database (not shown) which may reside in the e-mail marketing center.

An additional example of the dataflow exchanges mentioned above is the data exchange that may occur between traffic building module 206 and site building module 202 as next described. Traffic building module 206 may extract key metatag information from site building module 202 so that such information may be used when submissions to third party search engines are made as may be requested by the user. Additionally, traffic building module 206 may also track other information that has been extracted from site building module 202 so that such information may then be used to promote web site 116 using, for example, descriptions or the indexing of web site 116 on search engines and keywords.

Another example of the exchange of data and data flow between modules is a method by which site building module 202 and store building module 204 may work in concert to update affiliate building module 208. Information regarding some or all of a visitor's presence on web site 116 may be captured by site building module 202. Preferably, all information from the time a visitor first reaches web site 116, to the time a user leaves website 116 is captured and logged in user session tables stored, for example, in the main merchant database mentioned above. These user session tables may keep track of the source of the visitor, such as, for example, the referring URL for the visitor, and also may record timestamps associated with the visit by the visitor, the time spent on web site 116 by the visitor, and the browser and computer environment information of the visitor.

Site building module 202 may also capture, retain and track information regarding a visitor that has been referred to web site 116 by an affiliate. This information may be held in visitor session fields (not shown) stored as part of the main merchant database mentioned above and may be updated in real-time, based on the visitor's activities on web site 116. Should the visitor then make a purchase on web site 116, the visitor's purchase may then be communicated by store building module 204 to affiliate building module 208, which may then automatically calculate and update the commission payout to the affiliate. Communication between store building module 204 and affiliate building module 208 preferably includes store building module 204 passing information to affiliate building module 208 regarding many or all of the purchase details associated with a customer (e.g., name of customer, ship-to address, bill-to address, and billing information).

Store building module 204 and site building module 202 also may exchange data between themselves. Product information that is inherent in selections of the user and input into store building module 204 by the user, may also then be cast or displayed by site building module 202 in a manner that is consistent with the choice of transaction model, product type (for example, computers, books, tents, etc.), and/or other factors. The foregoing selections and information made in the use of store building module 204 may then be transmitted to site building module 202 so that a visitor's shopping experience is consistent with the predominant type of product that is being sold and the transaction model that has been designated by the user of user program 108.

APPENDIX

An APPENDIX is included at the end of this application, which is incorporated by reference in full herein. The APPENDIX generally relates to operating procedures from a user's perspective for creating and maintaining web site 116 and describes in greater detail certain aspects of the functions and operations provided by the development architecture and system described above. The APPENDIX presents information regarding one specific example of an embodiment of the present invention and is not intended to be limiting in any way. Many other implementations of the present invention may be made.

CONCLUSION

By the foregoing description, an improved system and method for creating and maintaining a web site have been described. The improved system and method may be substantially or completely web-based such that the user can access server 104 to create and maintain web site 116 from almost any computer on a local or wide area network or providing Internet browsing capabilities, for example, using Microsoft's Internet Explorer 5.0 or newer versions. The user does not itself need to store a CD-ROM or other media that may become lost or misplaced, and the user does not need to use large amounts of space on its hard drive or other memory storage device while creating web site 116.

The foregoing description of specific embodiments reveals the general nature of the invention sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

APPENDIX

User manual excerpts for one working example of computer system 100 are set forth below. Further related support information may be found at http://support.ibuilder.com, which information is incorporated by reference in this APPENDIX. This APPENDIX is subject to copyright protection.

Sitebuilder

SiteBuilder is the Internet's premier web site building and managing application. Anyone can obtain instant impact by choosing from hundreds of professionally designed high-quality templates, and customizing them with our intuitive drag-and-drop editing software—without having to rely on a third-party software, or having to spend thousands of dollars for limited results.

SiteBuilder also includes a state-of-the-art hosting infrastructure to provide a reliable and secure business presence.

Here are just a few of the SiteBuilder features you will enjoy using:
    Vast Web Site Template Selection
    Graphics Editor
    HTML Editor
    Meta tag Editor To add a counter to your web site, follow the step-by-step instructions below:
    Log in to your administration site.
    Click on the "SiteBuilder" tab at the top of the window.
    Click "Launch SiteBuilder" on the left side of the window.
    Click on the "Settings" button at the top of the window.
    Click "Visitor Counter" on the left side of the window.
    Choose a counter style from the list of available counters.
    Enter a starting count in the Starting Count field.
    Choose an increment count.
    Choose the time period for which your counter will reset.
    Choose on which pages you would like the counter to appear.
    Click on the "Save" button at the bottom of the window.
    Close the window.

If you would like to remove the counter from your site, follow the steps above, choosing "No Counter" in Step 6.

If you wish to view your counter on your page(s), do the following:
    Return to the SiteBuilder home page. You will see the counter at the bottom left of the page.
    To publish changes to your live site follow these instructions To add your own logo or image file, follow the step-by-step instructions below:
    Log in to your administration site.
    Click on the "SiteBuilder" tab at the top of the window.
    Click "Launch SiteBuilder" on the left side of the window.
    A popup window will open
    Click on the "Design" button at the top of the window.
    A popup window will open
    Click "Logo" on the left side of the window.
    In the Logo section, click on the "Browse" button.
    A popup window will open
    If you do not see a "Browse" button, you need to click on the "upload" tab at the top, right-hand corner of the window.
    Locate the image, click on it to select it and then click on the "Open" button to open it.
    The popup window will close
    Choose the sizing options for your logo.
    Automatically resize image—Select this if you want your logo to be resized to fit the available area.
    Resize to these dimensions—Select this if you want to specify the dimensions that your logo is resized to.
    Do not resize image—Select this if you do not want your logo resized.
    Click on the "Save Information" button at the bottom of the window.
    To publish changes to your live site follow these instructions To change the color of your template, follow the step-by-step instructions below:
    Log in to your administration site.
    Click on the "SiteBuilder" tab at the top of the window.
    Click "Launch SiteBuilder" on the left side of the window.
    A popup window will open
    Click on the "Design" button at the top of the window.

A popup window will open
Click "My Templates" on the left side of the window.
Click on the "Selected Template" tab at the top, right-hand side of the window.
Click on "Modify Template" at the bottom of the window (it may be necessary to scroll to the bottom).
Select a new color scheme by clicking on the color scheme thumbnails displayed on the left side of the window.
A preview of the new template color will appear in the main window
When you are happy with your color selection, click on the "Select Template" button at the bottom of the window.
To publish changes to your live site follow these instructions To change the image theme of your template, follow the step-by-step instructions below:
Log in to your administration site.
Click on the "SiteBuilder" tab at the top of the window.
Click "Launch SiteBuilder" on the left side of the window.
A popup window will open
Click on the "Design" button at the top of the window.
A popup window will open
Click "My Templates" on the left side of the window.
Click on the "Selected Template" tab at the top, right-hand side of the window.
Click on "Modify Template" at the bottom of the window (it may be necessary to scroll to the bottom).
Select a new image theme by clicking on the image theme thumbnails displayed on the right side of the window.
A preview of the new template image theme will appear in the main window
When you are happy with your image theme selection, click on the "Select Template" button at the bottom of the window.
To publish changes to your live site follow these instructions To change your web site navigation to appear on the left or right of the page, follow the step-by-step instructions below:
Log in to your administration site.
Click on the "SiteBuilder" tab at the top of the window.
Click "Launch SiteBuilder" on the left side of the window.
A popup window will open
Click on the "Design" button at the top of the window.
A popup window will open
Click "My Templates" on the left side of the window.
Click on the "Selected Template" tab at the top, right-hand side of the window.
Click on "Modify Template" at the bottom of the window.
You may have to scroll to the bottom of the window to see the "Modify Template" link.
Click on "Flip template orientation" at the bottom of the page (it may be necessary to scroll to the bottom).
Click on the "Select Template" button at the bottom of the window.
To publish changes to your live site follow these instructions You can change any foreground image on your template in addition to the images within the content area of your template. To change the images in your template, follow the step-by-step instructions below:
Log in to your administration site.
Click on the "SiteBuilder" tab at the top of the window.
Click "Launch SiteBuilder" on the left side of the window.
A popup window will open
Click on the image that you would like to change or edit.
A popup window will open
Right-click on the image and select "Save Picture As . . . ".
A popup window will open
Select the location on your computer where you would like to save the image and click on the "Save" button at the bottom, right-hand side of the window.
The popup window will close
Edit the saved image with any image editor that you prefer.
The size (width, height, and resolution) and the file type (gif or jpg) must remain the same.
Return to the popup window in step #4.
Click on the "Browse" button on the right side of the window.
A popup window will open
Click on the "Upload New Image" button at the bottom of the window.
A popup window will open
Click on the "Browse" button on the right side of the window.
A popup window will open
Locate the replacement image that you edited in step #7 and click on the "Open" button at the bottom, left-hand side of the window.
The popup window will close
Click on the "Upload" button on the bottom of the window.
a confirmation window will open
Click on the "OK" button.
the confirmation window will close
Select the image that you just uploaded from the list of available images, and click on the "Ok" button at the bottom of the window.
the popup window will close
Click on the "Save" button at the bottom of the window.
a confirmation window will open
Click on the "OK" button.
a confirmation window will open
To publish changes to your live site follow these instructions To save your template to favorites follow the step-by-step instructions below:
Log in to your administration site.
Click on the "SiteBuilder" tab at the top of the window.
Click "Launch SiteBuilder" on the left side of the window.
A popup window will open
Click on the "Design" button at the top of the window.
A popup window will open
Click "Standard Templates" on the left side of the window.
While browsing the templates, click "Add to Favorites" to add them to your Favorite templates.
At any time while browsing our template selection, you can access your favorite templates by clicking the "Favorites" tab at the top, right-hand side of the window.

If you want to change your template, follow the step-by-step instructions below:
Log in to your administration site.
Click on the "SiteBuilder" tab at the top of the window.
Click "Launch SiteBuilder" on the left side of the window.
A popup window will open
Click on the "Design" button at the top of the window.
A popup window will open
Click "Standard Templates" on the left side of the window.
Browse our available templates by clicking the "Category" tab, "Most Popular" tab, or "Newest Designs" tab at the top, right-hand side of the window
Click on "Select Template" to apply the new template design to your web site.

You can also modify the template (select color scheme and template orientation) or add it to a list of your favorite templates.

When you change your template the content of your web site is not removed or changed. The new template will wrap itself around your existing content.

To publish changes to your live site follow these instructions

To view your chosen template, follow the step-by-step instructions below:
Log in to your administration site.
Click on the "SiteBuilder" tab at the top of the window.
Click "Launch SiteBuilder" on the left side of the window.
A popup window will open
Click on the "Design" button at the top of the window.
A popup window will open
Click "My Templates" on the left side of the window.
Your current design will appear in the window.

To determine how much storage you have used on your web site, follow the step-by-step instructions below:
Log in to your administration site.
Click the "SiteBuilder" tab at the top of the window.
Click "File Manager" on the left-hand side of the window.
A popup window will open
In the lower left hand corner of the File Manager window is a pie shaped representation of your disk space:
Disk space used
Disk space available To create a background image using SiteBuilder and add it to your web site, follow the step-by-step instructions below:
Log in to your administration site.
Click on the "SiteBuilder" tab at the top of the window.
Click "Graphic Tools" on the left side of the window.
A popup window will open
Click on the "Backgrounds" tab at the top of the window.
Click to select the background template that you want to start with.
Create or edit your background specifications:
Change the image size: Enter Width and/or Height in pixels.
Larger images will result in a longer load time for your web page.
Change Image Colors: Click the palette icon. To select the color you want to use, click either a basic colors box or the gradient. Click the bar to adjust the shade or color. The resulting color will appear in the box.
View/Hide the borders of the image: Click to Show/Hide Image Border.
Specify a transparent background: Check the Transparent background box.
A transparent background is not available for all images.
For a preview of your background, click on the "Create Image" button at the bottom of the window.

If you would like to change your background, check the "Restore Default Settings" box to create your background again.
To save your background, enter a file name and click on the "Save Image" button at the bottom of the window.
Click on the "OK" button in the popup confirmation window.
Close the window.
To set this image as your web site's background image follow these instructions.

Publishing Your Site

One of the unique features is Sitebuilder's ability to let you pick only those items that you wish to have published.
Once you are ready to publish, hit Publish.
go to the publish tab and click or unclick those items that you wish to update your live view.

Storebuilder

The storebuilder comes pre-equipped with a shopping cart and check out function that allows customers to shop at your store and then to pay for items purchased. The shopping cart and check out function can be used whether you are selling your own products or whether you are using products from Warehouse Direct. You will not need to set up your site differently if you are using either business model.

There are several ways to display your products. To change your product layout, follow the step-by-step instructions below:
Log in to your administration site.
Click on the "SiteBuilder" tab at the top of the window.
Click "Catalog Design" on the left side of the window.
Click "Product Listing" or "Product Details" on the left side of the window
Product Listing: Allows you to change the thumbnail view of your product catalog.
Product Details: Allows you to change the detailed view of products in your catalog.
Click on the "Layouts" tab at the top, right-hand side of the window.
Review the layout template choices. To get a detailed view of a template, click "Zoom in."
Click the radio button to select the layout that you would like to use.
Click on the "Save Information" button at the bottom of the window.
To publish changes to your live site follow these instructions To add a custom message to your product catalog follow the step-by-step instructions below:
Log in to your administration site.
Click on the "SiteBuilder" tab at the top of the window.
Click "Catalog Design" on the left side of the window.
Click "Product Listing" on the left side of the window
Click on the "Custom Messages" tab at the top, right-hand side of the window.
Enter the message you would like to appear on the top of your product catalog in the "Template Message on Top" field.
Enter the message you would like to appear at the bottom of your product catalog in the "Template Message on Bottom" field.
Click on the "Save Information" button at the bottom of the window.
To publish changes to your live site follow these instructions To change the default buttons for your product catalog (e.g. "buy now", "checkout", etc.), follow the step-by-step instructions below:
Log in to your administration site.
Click on the "SiteBuilder" tab at the top of the window.
Click "Launch SiteBuilder" on the left side of the window.
Click on the "Design" tab at the top of the window.
A popup window will open
Click "Button Styles" on the left side of the window.
Select the button style that you would like to use.

Click on the "Save Information" button at the bottom of the window.

To publish changes to your live site follow these instructions

To customize the product list options (the view with more than one product on a page), follow the step-by-step instructions below:

Log in to your administration site.
Click on the "SiteBuilder" tab at the top of the window.
Click "Catalog Design" on the left side of the window.
Click "Product Listing" on the left side of the window
Click on the "Options" tab at the top, right-hand side of the window.
Edit the options available.
For the following descriptions,
product list view: refers to when your product catalog displays more than one product.
product detail view: refers to the when your product catalog displays only one product.
product catalog: refers to both your product list view and your product detail view.
Maximum Columns: The maximum number of products to be displayed across one page of your product list view (e.g. 4 products across).
Maximum Rows: The maximum number of products to be displayed down one page of your product list view (e.g. 4 products down).
Cell Spacing: The spacing in between the products in your product list view (measured in pixels).
Table Header Color: The color of the top bar in your product list view.
Table Border Color: The color of the lines in between products in your product list view.
Table Background Color: The background color of your product catalog.
Image Border Color: The border color of the product images in your product catalog.
Retail Price Color: The color of the "Retail Price" in your product catalog.
Headers Color: The color of the product header (product title) in the product catalog.
Image Border Size: The size of the border around the images in your product catalog (measured in pixels).
Image Horizontal Space: The space on either side (left and right) of the images in your product catalog (measured in pixels).
Image Vertical Space: The space on either side (top and bottom) of the images in your product catalog (measured in pixels).
Force Image Width: This will set all of your images to a specific width in your product list view (measured in pixels). The height is automatically set in proportion to the width.
Force Image Height: This will set all of your images to a specific height in your product list view (measured in pixels). The width is automatically set in proportion to the height.
Show Selling Price: Determines whether or not your product's selling price is displayed in your product list view.
Show Suggested Retail Price: Determines how the suggested retail price is displayed in your product catalog ("yes with strike" shows the suggested retail price with a strike through the middle).
Retail Price Caption: This is the text that will appear to the left of the retail price (if the retail price is visible).
Selling Price Caption: This is the text that will appear to the left of the selling price (if the selling price is visible).
Click on the "Save Information" button at the bottom of the window.

To publish changes to your live site follow these instructions

You can publish changes from inside "SiteBuilder" (go to step 1) or from inside "Launch SiteBuilder" (go to step 5)

To select which pages to you would like to publish, follow the step-by-step instructions below:

Log in to your administration site.
Click on the "SiteBuilder" tab at the top of the window.
Click "Publish" on the left side of the window.
A popup window will open
Go to step 6 to complete the process
OR
If you are already in "SiteBuilder" under "Launch SiteBuilder" then you can follow the instructions below:
From the "Launch SiteBuilder" home page, click on the "Publish" button at the top, right-hand side of the window.
A list of your pages is displayed in the Page Updates section.
Click to deselect the pages you do not wish to publish. Each page with a checked box will be published to your live site.
Click on the "Publish Now" button at the bottom of the window.

The File Manager includes a file preview feature that will allow you to look at an image of the file before opening or uploading it. To use this feature, follow the step-by-step instructions below:

Log in to your administration site.
Click on the "SiteBuilder" tab at the top of the window.
Click on "File Manager" on the left side of the window.
Locate the file you would like to preview and click on it to select.
A preview of your file will appear in the File Preview window To rename a file located on your web site, follow the step-by-step instructions below:

Log in to your administration site.
Click on the "SiteBuilder" tab at the top of the window.
Click on "File Manager" on the left side of the window.
Click on the file you would like to rename.
Click on the "Rename" button at the top of the window.
Type the new file name.
Push the "Enter" key on your keyboard to save the new file name. (you can also click on any blank space in the same window)

To add a logo to your web site, you can either use your own image or pick one from SiteBuilder. If you already have an image you would like to use for a logo, please see below.

To create a logo using SiteBuilder and add it to your web site, follow the step-by-step instructions below:

Log in to your administration site.
Click on the "SiteBuilder" tab at the top of the window.
Click "Graphic Tools" on the left side of the window.
Click on the "Logos" tab at the top, right-hand side of the window.
Click to select the logo template that you want to start with.
Edit the logo specifications:
Enter your own text (e.g. your company name).

Select the font, choose the formatting (e.g. italics and/or bold), etc.

Enter the width and/or weight in pixels.

Larger images will result in a longer load time for your web page.

Change Image Colors: Click the palette icon. To select the color you want to use, click either a basic colors box or the gradient. Click the bar to adjust the shade or color. The resulting color will appear in the box.

View/Hide the borders of the image: Click to Show/Hide Image Border.

Specify a transparent background: Check the Transparent background box.

A transparent background is not available for all images.

For a preview of your logo, click on the "Create Image" button.

If you would like to change your logo, check the Restore Default Settings box to create your logo again.

To save your logo, enter a file name and click on the "Save Image" button below.

Click on the "OK" button in the popup confirmation window.

Close the window.

To add this as a logo please read Adding a logo to my template

To create a bullet image for your pages, follow the step-by-step instructions below:

Log in to your administration site.

Click on the "SiteBuilder" tab at the top of the window.

Click "Graphic Tools" on the left side of the window.

Click on the "Bullets" tab at the top, right-hand side of the window.

Click to select the bullet template that you want to start with.

Create or edit your bullet specifications:

Change the image size: Enter Width and/or Height in pixels.

Larger images will result in a longer load time for your web page.

Change Image Colors: Click the palette icon. To select the color you want to use, click either a basic colors box or the gradient. Click the bar to adjust the shade or color. The resulting color will appear in the box.

View/Hide the borders of the image: Click to Show/Hide Image Border.

Specify a transparent background: Check the Transparent background box.

A transparent background is not available for all images.

For a preview of your bullet, click on the "Create Image" button at the bottom of the window.

If you would like to change your bullet, check the "Restore Default Settings" box to create your bullet again.

To save your bullet, enter a file name and click on the "Save Image" button below at the bottom of the window.

Click on the "OK" button in the popup confirmation window.

Close the window.

To add this image to your web site follow these instructions.

To create a button image for your web site, follow the step-by-step instructions below:

Log in to your administration site.

Click on the "SiteBuilder" tab at the top of the window.

Click on "Graphic Tools" on the left side of the window.

Click on the "Buttons" tab at the top, right-hand side of the window.

Click to select the button template that you want to start with.

Create or edit your logo specifications:

Change the text: Enter your text.

Change the font: Select the font. Choose italics and/or bold, if you wish. Enter the ratio.

Change the image size: Enter Width and/or Height in pixels.

Larger images will result in a longer load time for your web page.

Change Image Colors: Click the palette icon. To select the color you want to use, click either a basic colors box or the gradient. Click the bar to adjust the shade or color. The resulting color will appear in the box.

View/Hide the borders of the image: Click to Show/Hide Image Border.

Specify a transparent background: Check the Transparent background box.

A transparent background is not available for all images.

For a preview of your button, click on the "Create Image" button at the bottom of the window.

If you would like to change your button, check the Restore Default Settings box to create your button again.

To save your button, enter a file name and click on the "Save Image" button at the bottom of the window.

Click on the "OK" button in the popup confirmation window.

Close the window.

To add this image to your web site follow these instructions.

To create a divider image for your pages, follow the step-by-step instructions below:

Log in to your administration site.

Click on the "SiteBuilder" tab at the top of the window.

Click "Graphic Tools" on the left side of the window.

Click on the "Dividers" tab at the top, right-hand side of the window.

Click to select the divider template that you want to start with.

Create or edit your divider specifications:

Change the image size: Enter Width and/or Height in pixels.

Larger images will result in a longer load time for your web page.

Change Image Colors: Click the palette icon. To select the color you want to use, click either a basic colors box or the gradient. Click the bar to adjust the shade or color. The resulting color will appear in the box.

View/Hide the borders of the image: Click to Show/Hide Image Border.

Specify a transparent background: Check the Transparent background box.

A transparent background is not available for all images.

For a preview of your divider, click on the "Create Image" button at the bottom of the window.

If you would like to change your divider, check the Restore Default Settings box to create your divider again.

To save your divider, enter a file name and click on the "Save Image" button at the bottom of the window.

Click on the "OK" button in the popup confirmation window.

Close the window.

To add this image to your web site follow these instructions.

File Manager

To use the File Manager to upload files from your computer to your web site, follow the step-by-step instructions below:
> Log in to your administration site.
> Click on the "SiteBuilder" tab at the top of the window.
> Click on "File Manager" on the left side of the window.
> Transfer files from the Local Files window to the Web Site Files window by doing one of the following:
> Drag the icon of the file you wish to upload from the Local Files window to the Web Site Files folder OR
> Click on the file you wish to upload and click on the "Upload" button in the top menu.

You are able to upload all the files listed below in File Manager:
> .gif
> .jpg
> .htm
> .asp
> .html
> .txt
> .xls (Excel)
> .doc (Word)
> .pdf (Adobe PDF)
> .zip Traffic Builder The Trafficbuilder helps you promote your site or to launch e-mail campaigns. You can add to the list yourself but the e-mail list is constantly being updated as products are bought and affiliates added. Whenever you have a new customer that buys a product or an affiliate registers with you, that name is automatically added to the e-mail list.

You do not have to manually enter your description or keywords on every page. When you create your meta tags in SiteBuilder's Global Meta tags tool, these keywords are automatically entered on every page of your web site.

To create meta tags for your web site, read Creating meta tags for my web site.

A meta tag is an HTML tag or keyword that contains information and a description of the contents of a web page. Most search engines point to web pages based on the meta tags. When you submit your web site to search engines, your customers will be able to find your listing if they choose your keywords or meta tags. To create meta tags for your web site, follow the step-by-step instructions below:
> Log in to your administration site.
> Click on the "SiteBuilder" tab at the top of the window.
> Click "Launch SiteBuilder" on the left side of the window.
> A popup window will open
> Click on the "Settings" tab at the top of the window.
> A popup window will open
> Click "Global Metatags" on the left side of the window.
> Enter the Main Properties details for your web site in the fields provided.

For more information on the description and keywords that you choose click here.
> Enter the Author and Ownership details for your web site in the fields provided.
> For more information on these settings click here.
> Enter the Content Classification & Indexing details for your web site in the fields provided.
> Click on the "Save" button at the bottom of the window.
> To publish changes to your live site follow these instructions Here is an overview of your Content Classification and Indexing section in Global Meta tags.
> Robots: Choose to allow a robot to Index Your Page or Do Not Index. You may also choose for the robot to Follow or No Follow all hyperlinks or pages in your site. Finally, you may choose to have a robot revisit your site never or from 7 days to 12 months' time.
> Content Type: We strongly advise that you use the default text/html settings provided unless you know that your pages contain characters other than text or html.
> Resource Type: Choose what type of resource your page came from.
> Classification: Choose whether your business or site is Commercial or Private.
> Distribution: Choose whether you will distribute Globally, Locally or Internally.
> Language: Select your language of choice.
> Country: Select the country out of which you operate.
> Rating: Choose the viewing or rating of your web site: Restricted, Mature, Over 14 years of age, or General.

Keep in mind that you are entering a description and keywords that will be categorized and listed on search engines. The description of your site should entice customers to shop your site. You may want to describe your services, products, specialties, pricing and sales.

When customers search for web sites, they enter keywords on search sites. Your site's keywords should represent your products and services with brand names.

For example if you were selling decorative children's furniture, you may use the keywords:
> kid's, beds, rockers, lamp, decorations, child, children, furniture, red, blue, pink, dresser, chair, trucks, cars, bunnies, puppies, cute, affordable, oak, and quality.

To add a set of links to your product categories, follow the step-by-step instructions below:
> Log in to your administration site.
> Click on the "SiteBuilder" tab at the top of the window.
> Click "Launch SiteBuilder" on the left side of the window.
> A popup window will open
> Click on the "Navigation" button at the top of the window.
> A popup window will open To add a set of links to your product categories to your web site, Click on the page (in the left column) that you would like to affect.
> Click on the "Link Type" drop-down menu and select the "Set of links to product categories" option.
> Click on the "Apply Changes" button.
> After you are done with any of these changes click on the "Save Information" button at the bottom of the window.
> To publish changes to your live site follow these instructions To add an external link (to a page that's not in your web site) to your web site navigation, follow the step-by-step instructions below:
> Log in to your administration site.
> Click on the "SiteBuilder" tab at the top of the window.
> Click "Launch SiteBuilder" on the left side of the window.
> A popup window will open
> Click on the "Navigation" button at the top of the window.
> A popup window will open
> To add an external link to your web site,
> Click on the page (in the left column) that you would like to affect.

Click on the "Link Type" drop-down menu and select the "other link" option.
Click in the "Link URL" field and enter the url that you would like to link to. (for example, http://www.yahoo.com)
Click on the "Apply Changes" button.
After you are done with any of these changes click on the "Save Information" button at the bottom of the window.
To publish changes to your live site follow these instructions To add an internal link (another page in your web site) to your web site navigation, follow the step-by-step instructions below:
Log in to your administration site.
Click on the "SiteBuilder" tab at the top of the window.
Click "Launch SiteBuilder" on the left side of the window.
A popup window will open
Click on the "Navigation" button at the top of the window.
A popup window will open To link to another page on your web site,
Click on the page that you would like to affect (in the left column)
Click on the "Linked Page" drop-down menu, and select the page you want to link to.
Click on the "Apply Changes" button.
After you are done with any of these changes click on the "Save Information" button at the bottom of the window.
To publish changes to your live site follow these instructions Many of our newer templates include controls for both vertical and horizontal navigation that allow you to edit and arrange the navigation as you please. For example you could place all product-related links on your vertical navigation (down either side of your web site), and place all of the company-related links on your horizontal navigation (across the top of your web site).

To access your "Navigation" editor, follow the step-by-step instructions below:
Log in to your administration site.
Click on the "SiteBuilder" tab at the top of the window.
Click "Launch SiteBuilder" on the left side of the window.
A popup window will open
Click on the "Navigation" button at the top of the window.
A popup window will open
The tools and steps to add a link, rename a link, move a link, and remove a link on your navigation are the same. Use the tabs at the bottom, left-hand side of the window to switch between your "Vertical" and "Horizontal" navigation.

To organize your navigation, follow the step-by-step instructions below:
Log in to your administration site.
Click on the "SiteBuilder" tab at the top of the window.
Click "Launch SiteBuilder" on the left side of the window.
A popup window will open
Click on the "Navigation" button at the top of the window.
A popup window will open
To move, indent, or outdent a page,
Click on the page that you would like to affect (in the left column)
Click on the "up," or "down," arrow buttons at the top, left-hand side of the window.
After it is placed where you want it, click on the "Apply Changes" button.
At this time not all templates support indented (tiered) navigation. You may have to change your template in order to gain this functionality.
After you are done with any of these changes click on the "Save Information" button at the bottom of the window.
To publish changes to your live site follow these instructions To organize your navigation, follow the step-by-step instructions below:
Log in to your administration site.
Click on the "SiteBuilder" tab at the top of the window.
Click "Launch SiteBuilder" on the left side of the window.
A popup window will open
Click on the "Navigation" button at the top of the window.
A popup window will open
To move, indent, or outdent a page,
Click on the page that you would like to affect (in the left column)
Click on the "up," or "down," arrow buttons at the top, left-hand side of the window.
After it is placed where you want it, click on the "Apply Changes" button.
At this time not all templates support indented (tiered) navigation. You may have to change your template in order to gain this functionality.
After you are done with any of these changes click on the "Save Information" button at the bottom of the window.
To publish changes to your live site follow these instructions To remove a link (item) from your navigation, follow the step-by-step instructions below:
Log in to your administration site.
Click on the "SiteBuilder" tab at the top of the window.
Click "Launch SiteBuilder" on the left side of the window.
A popup window will open
Click on the "Navigation" button at the top of the window.
A popup window will open
To remove a link from your web site's navigation,
Click on the page that you would like to affect (in the left column)
Click on the red "X" button at the top of the window.
A popup window will open
Click on the "OK" button to confirm the delete request (not pictured)
This process does not remove the page from your system. This only removes the link to that page from your web site's navigation.
After you are done with any of these changes click on the "Save Information" button at the bottom of the window.
To publish changes to your live site follow these instructions To rename a link in your navigation, follow the step-by-step instructions below:
Log in to your administration site.
Click on the "SiteBuilder" tab at the top of the window.
Click "Launch SiteBuilder" on the left side of the window.
A popup window will open
Click on the "Navigation" button at the top of the window.
A popup window will open
To edit the link name (the name that appears on your navigation),
Click on the page that you would like to affect (in the left column)
Edit the "Link Caption" field.

Click on the "Apply Changes" button.

After you are done with any of these changes click on the "Save Information" button at the bottom of the window.

To publish changes to your live site follow these instructions

StoreBuilder gives small businesses the ability to manage all aspects of selling products online efficiently, effectively and with maximum flexibility. This includes the ability to receive online orders, manage customers, vendors, and products and much more. Best of all, with our virtual "Warehouse Direct" service, businesses are able to create or supplement their own inventory with new products and boost their sales, without having to stock or manage the physical inventory. Here are just a few of the StoreBuilder features you will enjoy using:

Warehouse Direct service
Online product catalog manager
Payment manager
Real-time sales and customer manager
Promotions and e-coupons In order to accept credit cards on your site you must have a merchant account with one of the processors that we currently support. iBuilder has partnered with Paymentech, a merchant account provider, to enable credit card transactions on your online store. We also accept a variety of other merchant account providers if you already have one setup.

Please email support@ibuilder.com for more information or to sign up today!

If you have a merchant account and would like to process credit card orders offline, please follow the step-by-step instructions below:

Log in to your administration site.
Click on the "StoreBuilder" tab at the top of the window.
Click "Payment Manager" on the left side of the window.
Click "Payment Options" on the left side of the window.
Click on the "Manual Processing (Offline)" radio button.
Select each credit card you are authorized to accept with your merchant account.
Click on the "Save Information" button at the bottom of the window.

You can copy images of credit card logos from other e-commerce web sites on the Internet. You could also use the images shown below. Follow the step-by-step instructions below to add the image(s) to your web site:

Find the credit card images you would like to use. We have included some examples below.

Right-click the image and click Save Picture As
Type the name you want for the file in the "file name" field.
Click on the "Save" button to save it to your computer.
Use SiteBuilder to add the image to the desired location on your web site.

Credit card transactions are the most efficient way of receiving payment from customers who make purchases from your online store. Today's shoppers come to expect the convenience of paying by credit card. A merchant account is necessary for all businesses that accept credit cards.

Fortunately, iBuilder has joined with Paymentech so you can register for an account directly from our site.

Funds from credit card purchases your customers make are then directed to a secure bank account.

Learn how to set up your merchant account.

If you do not already have a merchant account email support@ibuilder.com to sign up today!

Follow the step-by-step instructions below to setup one of our many supported merchant accounts:

Log in to your administration site.
Click on the "StoreBuilder" tab at the top of the window.
Click "Payment Manager" on the left side of the window.
Click "Payment Options" on the left side of the window.
Select each credit card you are authorized to accept with your merchant account.
In the Merchant Account Information section, select the merchant account provider you are using.
Please enter the merchant account information in the fields provided after choosing your processor. (as shown in the screenshots below)
Authorize.Net
This information is given to you by Authorize.Net.
ECHOnline
This information is given to you by ECHOnline.
LinkPoint
This information is provided to you by LinkPoint.
WorldPay
This information is provided to you by WorldPay.
BluePay
This information is provided to you by BluePay.
Paymentech
This information is provided to you by Paymentech.
Choose either "Authorize Only" or "Authorize and Deposit."
Details on each of these options is at the bottom of this document.

Authorize and Deposit:
This process will go through the whole transaction process and complete the transaction for you (if the card if valid), including depositing funds into your account. Authorize and deposit is the completely automated way of doing transactions. No intervention is needed to complete an order. Please check with your local tax and transaction authorities to make sure this is legal and permissible in your state.

Authorize Only:
The system will simply authorize the funds, make sure they are available on the card and will put a temporary hold on the funds until the transaction is completed. You must still use your Virtual Terminal, within your Admin Site, to complete these transactions. They will show up in the system as Authorized but not deposited (completed). Some states require that you do this until the product is actually shipped. Please check with your local tax and transaction authorities to make sure you are using the proper settings.
Click on the "Save Information" button at the bottom of the window. (The "Test Account settings" link will run a "test transaction" to make sure credit card processing is working correctly)
You may transfer an existing merchant account with Paymentech, CardService International, Authorize.net, ECHO Online, or PayPal.

To transfer your existing merchant account, follow the step-by-step instructions below:

Log in to your administration site.
Click on the "StoreBuilder" tab at the top of the window.
Click "Payment Manager" on the left side of the window.
Click "Payment Options" on the left side of the window.

Select each credit card you are authorized to accept with your merchant account.

In the Merchant Account Information section, select the merchant account provider you are using.

Please enter the merchant account information in the fields provided after choosing your processor. (as shown in the screenshots below)

Authorize.Net

This information is given to you by Authorize.Net.

ECHOnline

This information is given to you by ECHOnline.

LinkPoint

This information is provided to you by LinkPoint.

WorldPay

This information is provided to you by WorldPay.

BluePay

This information is provided to you by BluePay.

Paymentech

This information is provided to you by Paymentech.

Choose either "Authorize Only" or "Authorize and Deposit."

If you receive the "Terminal is not programmed for this service" error when processing a credit card transaction, this indicates that your merchant account is not set up to accept the credit card that is being used in this transaction. You will need to contact the company that you received your merchant account from to set up service for this type of credit card. If you purchased your merchant account through iBuilder, please contact support at support@ibuilder.com.

To send emails to your opt-in mailing list, please follow the step-by-step instructions below:

Log in to your administration site.

Click the "TrafficBuilder" tab at the top of the window.

Click "Email Marketing Center" on the left side of the window.

Click on the "New Message" button at the top of the window.

From the Email Recipient list menu, select "All Mailing List Subscribers" from the drop down menu to view all the people who have signed up for your mailing list.

If you do not want to send this email to all people in your opt-in list, simply highlight the email you wish to remove and push the "delete" or the "backspace" button on your keyboard. (You will know it was successfully removed if the email address is removed from the list)

Fill in the fields on the left side of the window. The fields are defined as follows:

"From Name" is the name that the merchant sees when you send the email

"From Email" is the email address that it will show as sent from

"Reply To Email" is the email address that replies will be sent to (this can be different than you "from" email)

"Send Email Report To" is a field for specifying to send a report about your opt-in email system to any email address you want.

"Priority" will set the priority status of your email when the merchant receives it.

"Message Type" is the format that the message will be sent in. Select the option that works best for your merchants, some will prefer HTML and some will prefer Plain Text.

"Subject" is the subject of your email

"Message" is the actual message that you want to send to your merchants.

Once you have completed the message click on the "Preview message" button to view your message before you send it or click on the "send message" button to send the message.

If you are sending emails to your entire opt-in list, it is a good idea to make sure that you remove any users that have requested to stop receiving emails from you.

The Email Marketing Center allows you to view your OPT-IN mailing list (customers that have signed up to receive messages and news). To view that list follow the step-by-step instructions below:

Log in to your administration site.

Click the "TrafficBuilder" tab at the top of the window.

Click "Email Marketing Center" on the left side of the window.

Click the "New Message" tab at the top, right-hand side of the window.

Click the drop down menu on the top, right-hand side of the window to view "all mailing list subscribers" or a "custom list of users".

Featured site listing allows you to submit your site to be featured on our network of sites and gain visibility.

This service is only offered to subscribers of the TrafficBuilder service. We feature only a limited number of sites, and must review each site before it is added as a featured site on our network.

If you feel your site will benefit from the extra exposure, please submit the request form in your administration site, under the TrafficBuilder tab. We will review your request and notify you as soon as possible if your site is selected to be listed as a featured web site.

For more information please contact support at support@ibuilder.com.

Pay Per Click (PPC) marketing is fast becoming a preferred marketing method for online merchants. Unlike other advertising methods, you pay only when you get results!

Here's how it works:

As the name suggests, what makes Pay-Per-Click unique is how you pay to have your site listed. Instead of paying a monthly or yearly fee, you pay a certain amount every times your link is clicked in the directory. That means if your pay-per-click rate is 5 cents and your listing is clicked on 10 times, you pay 50 cents. If nobody links to your web site from the directory you pay nothing Bidding PPC directories follow an auction-type format. Instead of being placed alphabetically or chronologically, listings on PPC directories are ordered from highest to lowest bid. If the bidding price of the top listing in a given search category is $2.50, for example, you would have to bid higher than $2.50 to make yours the top listing.

For more information about Pay-Per-Click Marketing, please log into your administration site and click the TrafficBuilder tab.

If you have submitted your web site to search engines through your administration site, you can view the status by following the step by step instructions below:

Log into your administration site.

Click on the "TrafficBuilder" tab at the top of the window.

Click "Search Engine Submission" on the left side of the window.

Click on the "History" tab at the top, right-hand side of the window.

Your search engine submission history is listed as Date Submitted, Total, Successful and Failed.

Click on the date for which you would like to view your search engine submissions.

Your submission information for that date is listed as Search Engine and Status.

Search engines list your web site based on the keywords or meta tags you enter in the Site Information Section.

Use any and all product brand names, descriptions or catch phrases. This will improve your chances of a higher ranking on the search engines and allow your customers to find your web site with more ease.

Advertise your site through newsgroups. For information about joining newsgroups, contact your Internet Service Provider.

Submit your web site to one or more of the premium search engines for which you are willing to pay a fee. These widely used search engines will display your site for a fee: The more you pay, the closer to the first page your listing will appear.

You are initially permitted to submit up to 125 search engines. To learn more about increasing the number of search engines you can submit to, contact support at sales@ibuilder.com.

In order for people to make a purchase on your web site, they must first find it. If you are registered with search engines, potential customers will be more likely to find your web site.

To submit your web site to search engines, enter your meta tag information in SiteBuilder, then follow the step-by-step instructions below:

Log in to your administration site.

Click on the "TrafficBuilder" tab at the top of the window.

Click "Search Engine Submission" on the left side of the window.

Enter your Contact Information and Site Information in the fields provided.

The Submission Counters section gives you the number of Search Engines you are able to submit to, the total number permitted and the number of submitted or selected for submission.

In the Search Engine Information section, click on each search engine you would like to submit to. Hold down the Ctrl key while clicking to select multiple search engines at one time. Click on the "Add" button at the bottom of the window.

To learn more about increasing the number of search engines that you can submit to, please contact support at sales@ibuilder.com.

After you have added all the desired search engines to your list, click on the "Submit" button at the bottom of the window.

Meta tags are HTML tags or keywords that contain information and a description of the contents of a web page or site like yours. Meta tags are created when you register with search engines. Most search engines point to related web pages by referencing meta tags. Meta tags help you provide keywords and descriptions on pages that lack text.

There are several meta tags, but the most important for search engine indexing are the description and keywords. The description returns a description of the page in place of the summary that the search engine would ordinarily create.

To maximize your site rankings, choose your product brand names and descriptions and update your descriptions regularly. You can even purchase paid listings on search engines.

If you have already registered with search engines and want to change your description or meta tag keywords, you can resubmit your search engine information once a month.

Learn how to add meta tags to your web site.

You may need to wait anywhere between 3-5 weeks (sometimes longer) from the time you submitted your web site before it is actually listed in search engines. This is due to the fact that the search engine must evaluate your web site for content, rate it, and then update their database.

If you submitted your web site to search engines through TrafficBuilder, you can check the status to find out if it has been accepted.

Affiliate:

If your site is only referring customers to other sites, the shopping cart and check-out functions will not be presented. You will not need to remove the shopping cart.

To add a new affiliate account, please follow the step-by-step instructions below:

Log in to your administration site.

Click on the "AffiliateBuilder" tab at the top of the window.

Click "Affiliate program Manager" on the left side of the window. A popup window will open Click "Affiliate Account Listing" on the left side of the window.

Click on the "Add new" button. A popup window will open

Enter the Affiliate's information (required fields are marked with a red arrow)

Click on the "save" button at the bottom of the window in order to save your changes. A popup window will open Click on the "ok" button. The popup window will close The affiliate will be saved.

To delete an affiliate, please follow the step-by-step instructions below:

Log in to your administration site.

Click on the "AffiliateBuilder" tab at the top of the window.

Click "Affiliate program Manager" on the left side of the window.

Click "Affiliate Account Listing" on the left side of the window.

Locate and select the affiliate account you wish to delete by clicking on the checkbox next to it.

Click on the "delete" button. A popup window will open

Click on the "ok" button to confirm the delete. The popup window will close

To edit an affiliate, please follow the step-by-step instructions below:

Log in to your administration site.

Click on the "AffiliateBuilder" tab at the top of the window.

Click "Affiliate program Manager" on the left side of the window. A popup window will open Click "Affiliate Account Listing" on the left side of the window.

Locate the Affiliate you wish to edit and click on their "customer name". A popup window will open Edit the fields that need to be altered for the Affiliate.

Click on the "save" button at the bottom of the window in order to save your changes. A popup window will open Click on the "ok" button at the bottom of the window in order to confirm the save. The popup window will close To make payments to an affiliate account, please follow the step-by-step instructions below:
    Log in to your administration site.
    Click on the "AffiliateBuilder" tab at the top of the window.
    Click "Affiliate program Manager" on the left side of the window.
    Click "Affiliate Account Listing" on the left side of the window.
    Click on the checkbox next to the affiliate you wish to make a payment to.
    Click on the "new payment" button. A popup window will open
    Enter the payment information in the fields provided.
    Click on the "save" button at the bottom of the window. A popup window will open
    Click on the "ok" button. The popup window will close
    The payment will be made as you selected.

To view a commissions report, please follow the step-by-step instructions below:
    Log in to your administration site.
    Click on the "AffiliateBuilder" tab at the top of the window.
    Click "Affiliate program Manager" on the left side of the window.
    Click "Affiliate Account Listing" on the left side of the window.
    Locate and select the Affiliate whose commission report you wish to view by clicking on the checkbox next to it.
    Click on the "Commissions report" button at the top of the window. A popup window will open
    Click any of the "date selection" drop down menu's available to narrow down the date range that is displayed.
    Click on the "go" button to sort the commissions reports.
    Locate the report you wish to view and click "view details" for that report. A popup window will open
    The details are displayed, when you are done looking at the details you can click the "close window" option at the bottom, right-hand side of the window. The popup window will close To view a detail report, please follow the step-by-step instructions below:
    Log in to your administration site.
    Click on the "AffiliateBuilder" tab at the top of the window.
    Click "Affiliate program Manager" on the left side of the window.
    Click "Affiliate Account Listing" on the left side of the window.
    Locate and select the Affiliate whose detail report you wish to view by clicking on the checkbox next to it.
    Click on the "Detail report" button at the top of the window. A popup window will open
    The selected detail report will be displayed.

To view payments made to an affiliate account, please follow the step-by-step instructions below:
    Log in to your administration site.
    Click on the "AffiliateBuilder" tab at the top of the window.
    Click "Affiliate program Manager" on the left side of the window.
    Click "Affiliate Account Listing" on the left side of the window.
    Click on the checkbox next to the affiliate that you wish to view payments for.
    Click on the "view payments" button. A popup window will open
    The payment information will be displayed.

To add a banner to the banner studio, please follow the step-by-step instructions below:
    Log in to your administration site.
    Click on the "AffiliateBuilder" tab at the top of the window.
    Click "Affiliate program settings" on the left side of the window.
    Click "Banner studio" on the left side of the window.
    Click on the "Add new" button. A popup window will open
    Click on the "browse" button A popup window will open
    Locate the banner file on your computer and click on it to select it. Then click on the "open" button. The popup window will close
    Enter the height of the banner in the "height" field.
    Enter the width of the banner in the "width" field.
    Click on the "upload" button.
    Click on the "OK" button.
    The banner will be saved in a "banners" folder on our servers. You can insert the banner just as you would insert any image, but look in the "banners" folder when locating the banner. For step-by-step instructions on inserting an image please check this help article.

To delete a banner from the banner studio, please follow the step-by-step instructions below:
    Log in to your administration site.
    Click on the "AffiliateBuilder" tab at the top of the window.
    Click "Affiliate program settings" on the left side of the window.
    Click "Banner studio" on the left side of the window.
    Locate the banner you wish to delete and select it by clicking the checkbox next to it.
    Click on the "delete" button at the top of the window. A popup window will open
    Click on the "ok" button to confirm the delete. The popup window will close

What is claimed:

1. A method for assembly of a web site for an online store of a seller, the method comprising:
providing the seller with access to a warehouse of predefined products for selection by the seller for use in the assembly of the web site, each of the predefined products to be provided by a respective predefined merchant other than the seller, and wherein the access includes displaying images for each of the products for online viewing by the seller during assembly of the web site;
receiving from the seller a selection from two or more transaction models to define an active transaction model for operation of the online store, at least one of the transaction models to specify customer order fulfillment by product delivery from the respective predefined merchant directly to the customer; and
generating, by at least one server, one or more web site files for the online store that incorporate the selected predefined products and that are configured to perform transactions by customers of the online store using the active transaction model.

2. The method of claim 1 wherein providing access to the warehouse further includes presenting two or more products from the warehouse on a single web page for viewing and selection by the seller during assembly of the web site.

3. The method of claim 1 wherein providing access to the warehouse further includes presenting two or more categories of products for selection by the seller, wherein the selection of one of the categories will cause the incorporation of a set of two or more products corresponding to the selected category into the online store.

4. The method of claim 3 further comprising receiving information from the seller regarding existing products of the seller to be offered in the online store along with the selected predefined products.

5. The method of claim 4 wherein the active transaction model is used for transactions with customers of the online store for both the existing products and the selected predefined products.

6. A method on at least one server to create a web site for an online store of a user communicating with the at least one server over a communication network, the method comprising:
   receiving a selection from the user in a user session of one or more predefined web site building blocks presented to the user for use in assembling the web site;
   during the user session, providing access for the user to a warehouse of predefined products for incorporation into the web site, wherein the warehouse is accessible by the at least one server and the predefined products correspond to products to be provided by one or more predefined merchants other than the user, and wherein the access comprises providing a single web page for the user's viewing product images and product information for two or more products corresponding to the predefined products;
   receiving from the user the selection of one or more of the predefined products for use in the web site;
   receiving from the user a selection from a set of two or more transaction models presented to the user to define an active transaction model for operation of the online store, wherein the set of transaction models comprises a customer-to-merchant model with product delivery by one of the predefined merchants; and
   generating, by the at least one server, one or more web site files for the online store using the selected web site building blocks and the selected predefined products, wherein the generated web site files are configured to perform transactions with customers of the online store using the active transaction model.

7. The method of claim 6 further comprising receiving from the user a selection of one of the set of transaction models, different from the active transaction model, to associate with at least one of the selected predefined products for use in fulfilling customer orders.

8. The method of claim 6 wherein the set of transaction models further comprises one or more of the following: an auction model, a customer-to-merchant model with product delivery by an entity controlling the web site, a customer-to-predefined merchant model with product ordering placed through the web site, and an affiliate model wherein the affiliate refers a customer to a merchant's web site to place a product order by the customer.

9. The method of claim 6 further comprising receiving from the user a modification of the selection of the active transaction model.

10. A system for assembly of a web site for an online store by a seller, the system comprising:

(i) at least one server comprising a site building module and a store building module, wherein:
   the site building module is configured to assemble the web site using predefined web site building blocks selected by the seller; and
   the store building module is configured to:
      permit selection by the seller from a warehouse of predefined products for incorporation into the web site, each predefined product to be provided by a respective predefined merchant other than the seller and to include product data stored prior to an initial visit to the at least one server by the seller, and
      permit selection by the seller of an active transaction model from two or more transaction models, at least one of the transaction models to specify customer order fulfillment by product delivery from the respective predefined merchant directly to the customer; and
(ii) at least one database coupled for access by the at least one server during assembly of the web site by the seller, wherein the at least one database is configured to store the predefined web site building blocks and the warehouse.

11. The system of claim 10 wherein the store building module is further configured to present two or more products from the warehouse on a single web page for selection by the seller during assembly of the web site, and wherein the two or more products are each presented with a product image and a product price.

12. The system of claim 11 wherein the product price is a suggested selling price.

13. A method for assembly in a user session by a user of a web site for an online store, the method comprising:
   accessing a warehouse of predefined products to select from for use in the assembly of the web site, each of the predefined products to be provided by a respective predefined merchant other than the user, wherein the access includes online viewing of images for each of the predefined products;
   selecting from two or more transaction models presented to the user to define an active transaction model for operation of the online store;
   displaying a live view of a prior published version of the online store;
   displaying a design view of the online store, the design view including the predefined products selected by the user, and the live and design views accessible for side-by-side viewing by the user in the same user session; and
   requesting generation of one or more web site files by at least one server for the online store that incorporate the selected predefined products and that are configured to perform transactions with customers of the online store using the active transaction model.

14. The method of claim 13 wherein the accessing of the warehouse further comprises viewing two or more products from the warehouse on a single web page for selection by the user during assembly of the web site, and wherein the two or more products are each presented with a product price.

* * * * *